US012746518B1

(12) United States Patent
Khasawneh

(10) Patent No.: US 12,746,518 B1
(45) Date of Patent: Sep. 29, 2026

(54) INTEGRATED DISPERSION AND QUANTIFICATION SYSTEM FOR ASPHALT MODIFICATION

(71) Applicant: PRINCE MOHAMMAD BIN FAHD UNIVERSITY, Dhahran (SA)

(72) Inventor: Mohammad Ali Khasawneh, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/552,294

(22) Filed: Feb. 27, 2026

(51) Int. Cl.

| | |
|---|---|
| ***E01C 19/10*** | (2006.01) |
| ***B01F 23/50*** | (2022.01) |
| ***B01F 23/53*** | (2022.01) |
| ***B01F 23/57*** | (2022.01) |
| ***B01F 27/272*** | (2022.01) |
| ***B01F 31/80*** | (2022.01) |

(Continued)

(52) U.S. Cl.

CPC ............ *B01F 23/551* (2022.01); *B01F 23/53* (2022.01); *B01F 23/57* (2022.01); *B01F 27/272* (2022.01); *B01F 31/83* (2022.01); *B01F 31/85* (2022.01); *B01F 31/89* (2022.01); *B01F 35/2115* (2022.01); *B01F 35/212* (2022.01); *B01F 35/2136* (2022.01); *B01F 35/221422* (2022.01); *E01C 7/262* (2013.01); *E01C 19/104* (2013.01); *B01F 2101/38* (2022.01); *B01F 2215/0427* (2013.01); *B01F 2215/0431* (2013.01); *B01F 2215/0454* (2013.01)

(58) Field of Classification Search

CPC ............... E01C 19/104; E01C 19/1045; B01F 35/2115; B01F 35/212; B01F 35/2136; B01F 35/221422

USPC ........................................................... 366/65

See application file for complete search history.

(56) References Cited

U.S. PATENT DOCUMENTS

| | | | | |
|---|---|---|---|---|
| 4,594,883 A * | 6/1986 | Pollard | B01J 19/18 | 73/54.23 |
| 11,746,068 B2 * | 9/2023 | Yamamoto | C06B 21/0008 | 149/109.6 |

(Continued)

FOREIGN PATENT DOCUMENTS

| | | |
|---|---|---|
| CN | 206381883 U | 8/2017 |
| CN | 115048785 A | 9/2022 |
| CN | 119165047 A | 12/2024 |

*Primary Examiner* — David L Sorkin

(74) *Attorney, Agent, or Firm* — Oblon, McClelland, Maier & Neustadt, L.L.P.

(57) ABSTRACT

An integrated dispersion and quantification system for asphalt modification includes a mixing chamber configured to receive an asphalt binder and at least one modifier material selected from a polymer, a fiber, an elastomeric particle, and a nanomaterial. A mixing mechanism is disposed within the mixing chamber and includes a coaxial high-shear rotor, a plurality of ultrasonic transducers, and a resonant acoustic mixing (RAM) unit. A multi-sensor array includes an optical sensor, a torque sensor, a viscosity sensor, a temperature probe, and an acoustic sensor. A controller is configured to determine a dispersion quality, activate or deactivate the mixing mechanism, and adjust shear-vortex strength, ultrasonic cavitation energy, vibrational acceleration, and acoustic resonance. A data-logging module generates a digital record of the dispersion quality, the sensing data, and energy usage for a mixing cycle.

20 Claims, 10 Drawing Sheets

(51) Int. Cl.

| | |
|---|---|
| ***B01F 31/85*** | (2022.01) |
| ***B01F 35/21*** | (2022.01) |
| ***B01F 35/212*** | (2022.01) |
| ***B01F 35/221*** | (2022.01) |
| ***E01C 7/26*** | (2006.01) |
| *B01F 101/38* | (2022.01) |

(56) References Cited

U.S. PATENT DOCUMENTS

| | | | | |
|---|---|---|---|---|
| 2008/0037363 | A1* | 2/2008 | Brannon | B01F 23/53 366/168.1 |
| 2008/0194772 | A1 | 8/2008 | Kong et al. | |
| 2013/0042793 | A1* | 2/2013 | Peregrine | C08L 95/00 106/668 |
| 2017/0274333 | A1* | 9/2017 | Smith | B01F 35/222 |
| 2025/0129292 | A1* | 4/2025 | Gee | E01C 19/1068 |

* cited by examiner

INTEGRATED DISPERSION AND QUANTIFICATION SYSTEM FOR ASPHALT MODIFICATION

BACKGROUND

Technical Field

The present disclosure is directed to asphalt processing technologies and, more particularly, relates to an integrated dispersion and quantification system for asphalt modification.

Description of Related Art

The "background" description provided herein is for the purpose of presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Asphalt binders are commonly modified with polymers, fibers, chemical additives, and other modifiers to enhance performance characteristics such as rutting resistance, fatigue life, temperature susceptibility, and durability. However, generating consistent performance depends not only on selecting the modifier but also on accurate dosing and uniform dispersion of the modifier throughout the asphalt matrix. Inadequate dispersion or inaccurate quantification can result in non-uniform material properties, premature pavement failure, increased material costs, and variability in field performance.

Conventional asphalt modification practices rely on batch or in-line blending systems in which modifiers are introduced into the asphalt binder using mechanical mixers, shear mills, or agitation tanks. Quantification of the modifier is often performed using indirect methods such as preset feed rates, gravimetric dosing devices, volumetric pumps, or manual sampling followed by laboratory analysis. Dispersion quality is inferred from mixing time, temperature, or shear conditions rather than being directly measured or verified during production.

Conventional systems suffer from several shortcomings. Preset dosing and indirect measurement techniques do not account for variations in material properties, flow conditions, or process disturbances, leading to inconsistent modifier concentrations. Mechanical mixing alone may be insufficient to ensure complete dispersion, particularly for high-viscosity binders or solid and elastomeric modifiers. Additionally, laboratory verification is time-consuming, retrospective, and impractical for real-time process control, resulting in delayed detection of off-spec material and increased waste or reprocessing.

CN119165047A describes a method and system for high-throughput mixing of multiple asphalt particles and performance characterization. The method includes transmitting ultrasonic waves to a reflection platform through an ultrasonic device. The method further includes selecting an optimal suspension point based on the emission range of an ultrasonic device. The method further includes enabling a mechanical arm to move a micro-needle to the optimal suspension point on a reflecting platform. The method further includes enabling the micro needle to extrude particles, heating the particles to a preset temperature using temperature-control equipment, and imaging the particles with a camera. The method further includes enabling the reflecting platform device and the ultrasonic device to act on the particles to perform characterization analysis.

CN206381883U describes a fiber-asphalt glue uniform-mixing self-checking unit. A self-testing device for uniformity in fiber asphalt mortar mixing includes a mixing unit, a testing unit, and a control unit connected to both the mixing unit and the testing unit. The mixing unit includes a mixing reaction pot, and a sealing plate is arranged above the mixing reaction pot. A stirrer is arranged at the bottom of the sealing plate, and several stirring rods are arranged on the stirrer. The test unit includes a viscosity sensor and a temperature sensor arranged on the stirring rod. The control unit includes a PLD controller connected to the viscosity sensors.

Each of the aforementioned references suffers from one or more drawbacks that hinder their adoption, such as reliance on indirect or pre-calibrated dosing methods, an inability to directly measure or verify the uniform dispersion of modification agents within the asphalt binder during production, and limited adaptability to different modifier types, concentrations, or binder rheologies. Accordingly, it is one object of the present disclosure to provide an integrated dispersion and quantification system for asphalt modification. The system may enable accurate, real-time measurement of modifier concentration while simultaneously ensuring uniform dispersion within the asphalt binder. The system may improve process control, reduce variability, minimize material loss, and enhance the reliability and performance consistency of modified asphalt products.

SUMMARY

In an exemplary embodiment, an integrated dispersion and quantification system for asphalt modification is described. The integrated dispersion and quantification system includes a mixing chamber configured to receive an asphalt binder and at least one modifier material selected from the group consisting of a polymer, a fiber, an elastomeric particle, and a nanomaterial. The system further includes a mixing mechanism disposed within the mixing chamber. The mixing mechanism includes a coaxial high-shear rotor. The mixing mechanism further includes a plurality of ultrasonic transducers positioned circumferentially around the mixing chamber and configured to generate a multi-directional sonication field and an ultrasonic cavitation zone. A resonant acoustic mixing (RAM) unit is configured to generate a vibrational acceleration and an acoustic resonance. A multi-sensor array includes at least one of an optical sensor, a torque sensor, a viscosity sensor, a temperature probe, and an acoustic sensor. A controller is operatively coupled to the mixing mechanism and the multi-sensor array. The controller is configured to determine a dispersion quality via a Dispersion Uniformity Index (DUI) based on sensing data from the multi-sensor array. The controller is further configured to activate or deactivate at least one component of the mixing mechanism in response to the DUI. The controller is further configured to adjust one or more of the shear-vortex strength generated by the high-shear rotor, the ultrasonic cavitation energy generated by the ultrasonic transducers, the vibrational acceleration, and the acoustic resonance. A data-logging module is configured to generate a digital record of the dispersion quality, the sensing data, and energy usage for a mixing cycle.

In some embodiments, the mixing chamber includes a pressure vessel selected from the group consisting of a cylindrical pressure-rated vessel, a jacketed thermal-control vessel, a double-walled insulated vessel, and a composite-reinforced metal vessel. The mixing chamber has an internal diameter between 50 and 300 mm, a wall thickness between 2 and 8 mm, and an internal coating selected from the group consisting of a fluoropolymer lining, a ceramic reinforced epoxy, and a boron nitride coating.

In some embodiments, the high-shear rotor is disposed at the center of the mixing chamber and mounted on a drive shaft aligned with the longitudinal axis of the mixing chamber. The ultrasonic transducers are mounted circumferentially around the mixing chamber and radially oriented to direct ultrasonic energy inward toward the high-shear rotor and an annular shear zone surrounding the high-shear rotor. The RAM unit is mechanically coupled to the exterior of the mixing chamber through a mounting frame and configured to transmit vibrational energy to the mixing chamber. The high-shear rotor, the ultrasonic transducers, and the RAM unit are spatially arranged to form a shear-acoustic mixing architecture including the shear zone generated by the high-shear rotor, the ultrasonic cavitation zone surrounding the shear zone, and a low-frequency vibrational field superimposed on the shear and ultrasonic cavitation zones by the RAM unit.

In some embodiments, the shear-acoustic mixing architecture includes the ultrasonic transducers positioned at a radial distance between about 5 and 25 mm from an outer perimeter of the high-shear rotor. The shear zone has a radial thickness between about 2 and 10 mm. The ultrasonic cavitation zone extends radially outward from the shear zone by between about 3 and 20 mm. The low-frequency vibrational field is aligned along a principal vibrational axis oriented parallel to the longitudinal axis of the mixing chamber.

In some embodiments, the mixing mechanism is configured for an effective shear rate between about 5,000 and 50,000 $s^{-1}$ within the shear zone, a combined mechanical-ultrasonic-acoustic energy density between about 0.5 and 5 kW/L, a shear-to-ultrasonic energy ratio between about 1:0.1 and 1:1. The mixing mechanism is further configured for a low-frequency vibrational coupling efficiency between about 60% and 95%, based on a ratio of the vibrational energy transmitted to the mixing chamber relative to an input energy of the RAM unit. The mixing mechanism is further configured for a mixing-zone residence time between about 1 and 30s per circulation cycle.

In some embodiments, the high-shear rotor is formed from a composition selected from the group consisting of a stainless steel 316L, a hardened tool steel, a tungsten-carbide-coated steel, a titanium alloy, and a ceramic-matrix composite alloy.

In some embodiments, the high shear rotor has a rotor diameter between about 20 and 120 mm, a rotor length between about 30 and 150 mm, a rotor thickness between about 1.0 and 6.0 mm, and between 12 and 48 shear teeth, with a tooth-tip clearance between about 50 and 500 μm. The high-shear rotor further has a surface-finish roughness between Ra 0.1 and 1.0 μm, a thermal-stability rating between 80° C. and 200° C. The high-shear rotor also has an abrasion-resistant coating selected from the group consisting of tungsten carbide, diamond-like carbon (DLC), and boron-nitride-based coatings.

In some embodiments, the ultrasonic transducers include a sonotrode element having a length between 20 and 120 mm and a tip diameter between 5 and 30 mm, configured to provide an acoustic-gain factor between 2× and 10×. The ultrasonic transducers further include a backing layer comprising tungsten, steel, and an epoxy-tungsten composite, with an acoustic impedance between 20 and 100 Mrayl. The ultrasonic transducers further include a matching layer including alumina, silica-epoxy composite, and polymer-ceramic laminate. The matching layer has a thickness of about 0.1 to 1.0 mm.

In some embodiments, the ultrasonic transducers are disposed in a circumferential array around the mixing chamber at angular intervals between about 10° and 90°. The ultrasonic transducers are disposed in a surround-field configuration configured to generate rotating, stationary, and swept-frequency sonication modes between 10 and 50 kHz. The ultrasonic transducers are disposed at an axial elevation between 5 and 60 mm above the base of the mixing chamber. The ultrasonic transducers are driven by a phase-shifted excitation signal with phase offsets of about 10° to 180°.

In some embodiments, the RAM unit includes a counter-oscillating mass assembly including a first oscillating mass and a second oscillating mass configured to move in opposite directions along a common oscillation axis. The RAM unit further includes an electromechanical actuator comprising at least one of a voice-coil actuator, a linear motor, and an eccentric-mass motor. A spring-mass resonance subsystem including one or more spring elements selected from the group consisting of coil springs, elastomeric isolators, and leaf springs.

In some embodiments, the RAM unit is configured to provide the vibrational acceleration of about 10 to 100 g, a stroke amplitude of about 0.1 to 5 mm. The RAM unit is further configured to resonate at about 10 to 1000 Hz, with a resonance amplitude of about 0.1 to 2 mm, and an input electrical power rating of about 100 to 2,000 W.

In some embodiments, the multi-sensor array is disposed along an inner wall of the mixing chamber at about 1 to 10 circumferential positions. The multi-sensor array is further disposed at multiple axial elevations spaced between about 10 and 80 mm apart within about 5 to 20 mm of the shear zone, and within a thermally insulated port. The thermally insulated port has a depth between about 2 and 10 mm, an inner diameter between 6 and 20 mm, a thermally insulating liner selected from the group consisting of ceramic-filled epoxy, polyimide, and aerogel-reinforced composite, and an acoustic-damping backfill selected from the group consisting of silicone gel and polyurethane elastomer. Each sensor is encapsulated with a coating selected from the group consisting of a high-temperature fluoropolymer coating, a ceramic-reinforced epoxy encapsulant, a silicone-polyimide elastomer, and a boron-nitride-filled polymer composite.

In some embodiments, the optical sensor is selected from the group consisting of a hyperspectral microarray, a tunable-wavelength MEMS filter, and a dual-wavelength scattering probe. The optical sensor includes an optical probe operating between about 400 and 900 nm with a sampling rate between about 10 and 200 Hz. The optical sensor further includes a collimated illumination beam having a spot diameter between about 0.5 and 3 mm. The optical sensor further includes a photodiode detector with a responsivity between about 0.1 and 0.9 A/W. The optical sensor includes an optical path length between about 1 and 10 mm. The optical sensor has a spectral resolution between about 2 and 20 nm, a signal-to-noise ratio between about 40 and 80 dB, an optical dynamic range between about 60 and 120 dB, and an optical-transmittance stability within about 0.5% over a 10-minute interval.

In some embodiments, the torque sensor includes a magnetoelastic transducer configured to measure torque between about 0.1 and 5 N·m. The torque sensor further includes a Wheatstone-bridge strain-gauge array with gauge factors between about 1.0 and 2.5. A magnetoelastic sensing core with permeability variation sensitivity between about 0.5 and 3%/MPa. A signal-conditioning module is operatively coupled to the strain-gauge array and the magnetoelastic transducer. The signal-conditioning module is configured to amplify an output of a Wheatstone bridge using a low-noise amplifier having an input-referred noise below about 20 nV/VHz, apply a low-pass filter having a cutoff frequency between about 10 and 500 Hz and apply a notch filter tuned to attenuate frequencies between about 10 and 100 Hz.

In some embodiments, the viscosity sensor is selected from the group consisting of a piezo-oscillatory micro-viscometer, a MEMS shear-mode resonator, and an ultrasonic attenuation-based viscosity analyzer. The viscosity sensor includes an ultrasonic rheology probe configured to measure apparent viscosity between about 0.1 and 50 Pa·s. The viscosity sensor further includes a spindle of the rheology probe having a diameter between 3 and 15 mm and a length between about 10 and 40 mm. The viscosity sensor further includes an oscillatory shear element configured to operate at frequencies between 1 and 200 Hz with shear strain amplitudes between 0.1 and 10% relative to a nominal shear gap between the spindle and the asphalt binder. The viscosity sensor further includes an ultrasonic viscosity probe operating between 1 and 10 MHz with an acoustic path length between about 1 and 8 mm. The viscosity sensor has a resolution between about 0.01 and 0.10 Pa·s, and a sampling rate between about 5 and 200 Hz.

In some embodiments, the temperature probe is selected from the group consisting of a MEMS micro-thermistor, a fiber-optic temperature probe, and a thin-film platinum micro-RTD. The temperature probe has an operating temperature between about 80 and 200° C., a response time between 50 and 300 ms, a thermal drift of less than about 0.05° C. per hour, and a sampling rate between about 5 Hz and 200 Hz. The temperature probe further has a nominal resistance of about 100 to 1,000 £ at 0° C., and a temperature coefficient of resistance (TCR) of about 0.00385 to 0.00392Ω/Ω/° C.

In some embodiments, the acoustic sensor is selected from the group consisting of a micro-electromechanical systems (MEMS) ultrasonic microphone, a fiber-optic hydrophone, and a piezoelectric acoustic sensor. The acoustic sensor includes a transduction element selected from the group consisting of a piezoelectric diaphragm, an optical interferometric sensing tip, and a MEMS ultrasonic membrane. The acoustic sensor further includes a front-end interface comprising at least one of an impedance-matching network, an optical demodulation circuit, and a charge-sensitive preamplifier. The acoustic sensor has a detection bandwidth between about 50 and 120 kHz, a signal bandwidth between about 5 and 50 kHz, a sensitivity between about −180 and −150 dB re 1 V/μPa, a noise floor below 5 μV RMS, and a dynamic range of at least 60 dB.

In some embodiments, the controller is operatively coupled to the mixing mechanism and configured to dynamically modulate the shear-vortex strength at rotor speeds between about 500 and 5,000 rpm, relative to ultrasonic cavitation energy between about 20 and 120 kHz. The controller is further configured to adjust the acoustic resonance between about 10 and 1,000 Hz to align the shear-vortex strength and the ultrasonic cavitation energy within a synchronization window of about 1 to 50 ms.

In some embodiments, the DUI is computed according to Equation (1):

$$DUI = w_1 T_{opt} + w_2 \eta_{norm} + w_3 A_{ac} \quad (1)$$

Where $T_{opt}$ is an optical transmittance, $\eta_{norm}$ is an apparent viscosity, $A_{ac}$ is an acoustic resonance amplitude, $w_1$ is a weighting factor between about 0.20 and 0.40, $w_2$ is a weighting factor between about 0.10 and 0.30, and $w_3$ is a weighting factor between about 0.20 and 0.40.

In some embodiments, the controller is configured to maintain the DUI between about 0.75 and 1.0 by adjusting at least one of the shear-vortex strength between about 5,000 and 50,000 $s^{-1}$, the ultrasonic cavitation energy between about 1 and 20 $W/cm^2$, and the vibrational acceleration between about 10 and 100 g. The controller is further configured for an ultrasonic excitation amplitude between about 10 and 200 Vpp and an ultrasonic excitation phase between about 0° and 360°. The controller is further configured to increase or decrease at least one of the shear-vortex strength, the ultrasonic cavitation energy, and the ultrasonic excitation amplitude via a closed-loop adaptive control algorithm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
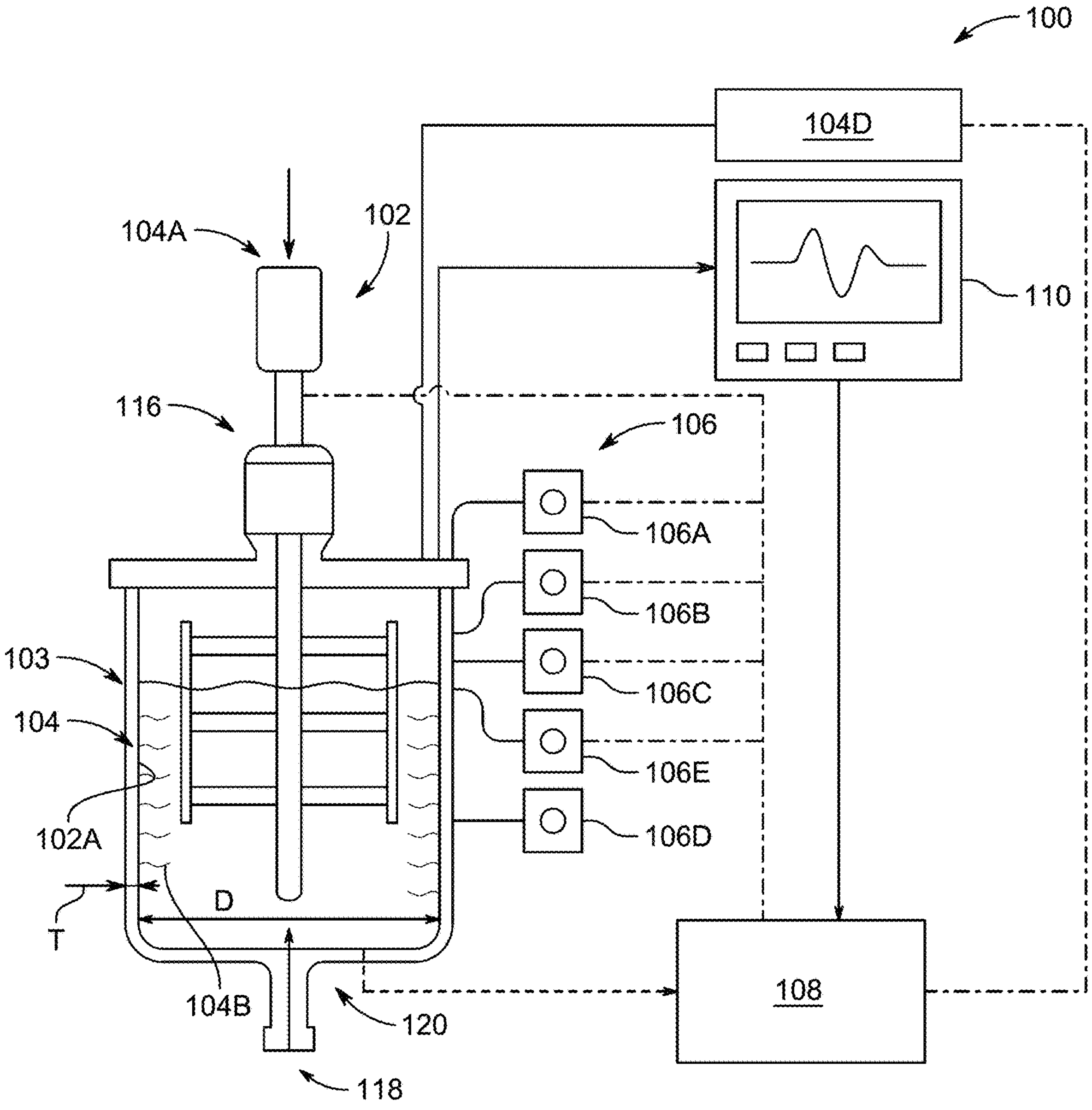
FIG. 1A is a schematic diagram of an integrated dispersion and quantification system for asphalt modification, according to certain embodiments.

In the drawings, like reference numerals designate identical or corresponding parts throughout the several views. Further, as used herein, the words "a", "an", and the like carry a meaning of "one or more", unless stated otherwise.

Furthermore, the terms "approximately," "approximate", "about" and similar terms refer to ranges that include the identified value within a margin of 20%, 10%, or preferably 5%, and any values therebetween.

As used herein, the term "elastomeric particle" refers to a discrete solid or semi-solid particle formed from an elastomeric material capable of reversible deformation under shear, including but not limited to crumb rubber, thermoplastic elastomer granules, SBS or SIS polymer pellets, and vulcanized rubber fragments, typically having a particle size between about 50 and 5 mm.

As used herein, the term "multi-directional sonication field" refers to an ultrasonic pressure-wave field generated by two or more ultrasonic transducers oriented such that acoustic energy propagates into the mixing chamber from multiple angular directions, producing intersecting wavefronts and spatially distributed cavitation activity.

As used herein, the term "backing layer" refers to a structural and acoustic-damping layer positioned behind a piezoelectric or ultrasonic transducer element and configured to absorb backward-propagating acoustic energy, stabilize transducer vibrations, and control bandwidth.

As used herein, the term "matching layer" refers to an acoustically engineered interface layer positioned between a transducer's radiating surface and the asphalt binder, with a selected acoustic impedance and thickness to improve transmission efficiency and reduce reflection losses.

As used herein, the term "circumferential array" refers to an arrangement of multiple ultrasonic transducers positioned around the perimeter of the mixing chamber at defined angular intervals such that the transducers collectively encircle the high-shear rotor.

As used herein, the term "surround-field configuration" refers to a transducer-driving configuration in which ultrasonic transducers in a circumferential array are actuated with coordinated amplitudes, phases, or frequencies to generate a spatially enveloping acoustic field that surrounds the shear zone.

As used herein, the term "phase-shifted excitation signal" refers to an electrical drive signal applied to each ultrasonic transducer with a controlled phase offset relative to adjacent transducers, typically between 10° and 180°, to shape or steer the resulting acoustic field.

As used herein, the term "spring-mass resonance" refers to a vibrational mode generated by a mechanical subsystem comprising one or more spring elements and one or more oscillating masses, the subsystem oscillating at or near its natural resonant frequency to amplify vibrational displacement or acceleration transmitted to the mixing chamber.

Aspects of this disclosure are directed towards an integrated dispersion and quantification system for asphalt modification. The system includes multiple interconnected components working together to introduce, disperse, monitor, and quantify one or more modification agents within an asphalt binder in a controlled and coordinated manner.

The system may be deployed in industrial production plants, quality-control laboratories, and research and development facilities. The system enables verified, real-time quality assurance, standardized, repeatable performance metrics, and digital traceability of process parameters and material properties for regulatory, contractual, and manufacturing compliance. In particular, the system ensures consistent production of polymer-modified, nanomaterial-modified, and fiber-reinforced asphalt binders while optimizing energy consumption and generating reproducibility exceeding 99%.

Referring to FIG. 1A, a schematic diagram of an integrated dispersion and quantification system 100 for asphalt modification is illustrated, according to certain embodiments. The integrated dispersion and quantification system 100 for asphalt modification is alternatively referred to as 'the system 100' throughout the specification.

The system 100 refers to an apparatus configured to introduce one or more asphalt modification agents into an asphalt binder, actively disperse the modification agents within the binder, and quantitatively measure dispersion quality and modifier concentration in real time or near real time during operation.

In some embodiments, modifier concentration is quantified by measuring optical absorbance or scattering signatures with the optical sensor 106A. The controller 108 compares measured optical intensity ratios at two or more wavelengths to calibration curves derived from reference mixtures containing known modifier concentrations. In another embodiment, modifier concentration is inferred from deviations in viscosity relative to a baseline viscosity model stored in memory. In another embodiment, acoustic attenuation characteristics within the ultrasonic cavitation zone 112B are correlated to particle loading. The controller 108 integrates optical, rheological, and acoustic indicators to estimate modifier concentration in real time.

In one embodiment, the controller determines modifier concentration using calibrated relationships between measured physical responses—specifically optical, rheological, acoustic, and torque signals—and known modifier percentages prepared during laboratory calibration. Each sensing modality provides an independent estimate of modifier concentration, and the controller fuses these estimates to obtain a robust real-time concentration value.

In some embodiments, the optical sensor measures transmitted light intensity through the asphalt-modifier mixture. Absorbance A is computed using:

$$A = -\log_{10}\left(\frac{I}{I_0}\right)$$

Where $I_0$ is the reference intensity of the unmodified binder, and I is the real-time transmitted intensity during mixing.

Modifier concentration C is then estimated using a calibrated linear model:

$$C = k_1 A + k_0$$

where $k_0$ and $k_1$ Calibration constants are derived from laboratory-prepared blends containing known modifier percentages (e.g., 0%, 2%, 4%, 6%). This method leverages the well-established proportionality between absorbance and concentration observed in polymer-modified asphalt systems.

In some embodiments, the system measures real-time viscosity $\eta_{meas}$ and compares it to the baseline viscosity no of the neat binder at the same temperature. The relative viscosity deviation is computed as:

$$\Delta\eta = \frac{\eta_{meas} - \eta_0}{\eta_0}$$

Modifier concentration is then estimated using:

$$C = a_1 \Delta\eta + a_0$$

where $a_0$ and $a_1$ are calibration constants. This reflects the widely documented increase in viscosity associated with polymer, rubber, and fiber modifiers in asphalt binders.

In some embodiments, the controller monitors mixing torque, which increases with modifier content due to elevated mixture stiffness and shear resistance. The torque deviation is computed as:

$$\Delta\tau = \tau_{meas} - \tau_0$$

Where $\tau_0$ is the torque of the neat binder, and $\tau_{meas}$ is the real-time torque during mixing.

Modifier concentration is then estimated using:

$$C = b_1 \Delta\tau + b_0$$

where $b_0$ and $b_1$ are calibration constants. This approach aligns with industrial asphalt-blending practice, where torque is a direct indicator of mixture rheology.

In a preferred embodiment, the controller computes a fused concentration estimate using a weighted combination of optical, viscosity-based, and torque-based estimates:

$$C_{final} = \frac{w_1 C_{opt} + w_2 C_{vis} + w_3 C_{tor}}{w_1 + w_2 + w_3}$$

Where $C_{opt}$, $C_{vis}$, and $C_{tor}$ are the individual estimates, and $w_1$, $w_2$, and $w_3$ Weighing factors are assigned based on calibration accuracy, signal stability, and temperature sensitivity. This multi-sensor fusion approach enhances robustness under plant-scale variations in temperature, shear rate, and mixing energy.

Calibration is performed using laboratory-prepared asphalt samples containing known modifier concentrations (e.g., 0%, 2%, 4%, 6%). For each concentration, the system records optical absorbance, viscosity deviation, and torque deviation. Regression analysis (linear or polynomial) is used to determine the calibration constants $k_i$, $a_i$, and $b_i$. Calibration is repeated when binder grade, modifier type, or plant operating conditions change, ensuring that the estimation algorithm remains directly tied to the physical behavior of asphalt-modifier systems rather than theoretical assumptions.

In some embodiments, calibration is performed using reference asphalt-modifier mixtures with known dispersion states and modifier concentrations. The controller 108 stores calibration constants for optical absorbance, viscosity response, acoustic amplitude, and cavitation index. Calibration may include:

❐ baseline optical intensity measurement

| viscosity-temperature mapping

| acoustic resonance amplitude mapping

¬ torque-shear correlation.

Calibration constants are updated periodically to maintain accuracy.

In some embodiments, the controller is configured to determine a modifier concentration of the asphalt-modifier mixture using a multi-parameter estimation algorithm that integrates optical, rheological, and acoustic measurements. In one embodiment, the modifier concentration $C_m$ is computed using an optical-absorbance-based model according to:

$$C_m = k_1 \cdot \left(\frac{I_{\lambda_1}}{I_{\lambda_2}}\right) + k_2$$

where $I_{\lambda_1}$, and $I_{\lambda_2}$ represent optical intensities measured at two wavelengths selected to maximize contrast between the asphalt binder and the modifier material, and $k_1$ and $k_2$. Calibration constants are determined from reference mixtures of known concentration. In another embodiment, the modifier concentration is estimated using a viscosity-deviation model in which the apparent viscosity n measured by the viscosity sensor is compared to a baseline viscosity curve stored in memory, and concentration is inferred from:

$$C_m = f(\eta, T)$$

where T is the measured temperature and f is a calibration function derived from rheological characterization of the modifier. In yet another embodiment, modifier concentration is estimated using acoustic attenuation or scattering signatures within the ultrasonic cavitation zone, wherein the controller computes an acoustic attenuation coefficient $\alpha$ and correlates it to concentration using a stored calibration curve. The controller may fuse optical, rheological, and acoustic estimates using a weighted least-squares or Kalman filter-based estimator to produce a final concentration value.

In some embodiments, the controller is configured to estimate modifier concentration using rheological deviations measured by the viscosity sensor. The apparent viscosity $\eta_{measured}$ of the asphalt-modifier mixture is compared to a baseline viscosity model $\eta_{baseline}(T, \dot{\gamma})$ stored in memory, where the baseline model represents the temperature- and shear-rate-dependent viscosity of unmodified asphalt. The controller computes a viscosity deviation parameter:

$$\Delta\eta = \eta_{measured} - \eta_{baseline}(T, \dot{\gamma})$$

The modifier concentration $C_m$ is then estimated using a linear or nonlinear calibration function:

$$C_m = b_0 + b_1\Delta\eta + b_2(\Delta\eta)^2$$

where $b_0$, $b_1$, and $b_2$ are calibration coefficients derived from rheological characterization of asphalt binders containing known modifier concentrations.

In another embodiment, the controller uses a shear-thinning model in which the viscosity-shear relationship is expressed as:

$$\eta(\dot{\gamma}) = \eta_0(1 + kC_m)\dot{\gamma}^{n(C_m)-1}$$

where $\eta_0$ is the zero-shear viscosity of the binder, k is a modifier-specific coefficient, and $n(C_m)$ is a flow-behavior index that decreases with increasing modifier concentration. The controller solves for $C_m$ using iterative curve-fitting or lookup-table interpolation.

In some embodiments, the modifier concentration is estimated from acoustic attenuation measurements within the ultrasonic cavitation zone. The controller computes an attenuation coefficient abased on the decay of acoustic amplitude over a known propagation distance:

$$\alpha = \frac{1}{d}\ln\left(\frac{A_0}{A_d}\right)$$

where $A_0$ is the initial acoustic amplitude at the transducer face, $A_d$ is the amplitude measured by the acoustic sensor after the propagation distance d, and $\alpha$ is correlated to modifier concentration using a stored calibration curve.

In another embodiment, the controller computes a cavitation-response index $C_{cav}$ based on the ratio of broadband acoustic emissions to the fundamental ultrasonic frequency:

$$C_{cav} = \frac{A_{broadband}}{A_{fundamental}}$$

where $A_{broadband}$ represents acoustic emissions associated with bubble collapse and micro-jet formation, and $A_{fundamental}$ represents the amplitude at the transducer's operating frequency. The cavitation-response index increases with modifier loading due to enhanced scattering and bubble-nucleation sites. The controller maps the cavitation-response index to the modifier concentration using regression models or lookup tables derived from calibration trials. In some embodiments, modifier concentration is inferred from torque measurements obtained from the torque sensor. The controller computes a torque deviation parameter:

$$\Delta\tau = \tau_{measured} - \tau_{baseline}(\omega, T)$$

where $\tau_{baseline}(\omega, T)$ is a reference torque curve for unmodified asphalt at rotor speed @ and temperature T. Modifier concentration is then estimated using:

$$C_m = c_0 + c_1\Delta\tau + c_2(\Delta\tau)^2$$

where $c_0$, $c_1$, and $c_2$ are calibration constants.

In another embodiment, the controller computes a torque-viscosity correlation:

$$\tau = K_\tau \cdot \eta_{apparent} \cdot \omega$$

where $K_\tau$ is a geometry-dependent constant. By combining torque and viscosity measurements, the controller improves the accuracy of concentration estimation under varying shear conditions.

In some embodiments, the controller combines optical, rheological, acoustic, and torque-based concentration estimates using a multi-parameter fusion algorithm to improve accuracy and robustness. The controller computes individual concentration estimates:

$C_o$ from optical absorbance or scattering, $C_r$ from viscosity deviation, $C_a$ from acoustic attenuation or cavitation response, $C_t$ from torque deviation.

The controller then computes a fused concentration estimate using a weighted-least-squares estimator:

$$C_m = \frac{w_oC_o + w_rC_r + w_aC_a + w_tC_t}{w_o + w_r + w_a + w_t}$$

where $w_o$, $w_r$, $w_a$, and $w_t$ are weighting factors determined during calibration based on sensor noise characteristics and sensitivity.

The system 100 is configured to accommodate a wide range of asphalt binders and modification agents, including polymers, elastomers, fibers, nanomaterials, chemical additives, and combinations thereof, across varying temperatures, viscosities, and flow regimes.

The system 100 further includes a mixing chamber 102 configured to receive an asphalt binder and at least one modifier. The mixing chamber 102 defines an internal processing volume sized and shaped for effective interaction between the asphalt binder and the modifier material under predetermined thermal, mechanical, and flow conditions.

In one embodiment, the mixing chamber 102 is configured to operate in a batch, continuous, or semi-continuous mode. The mixing chamber 102 includes an inlet 116 for introducing the asphalt binder and modifier material, and an outlet 118 for discharging the modified asphalt product. The configuration of the mixing chamber 102 enables uniform distribution of the modifier material while minimizing degradation of the binder or modifier.

In an embodiment, the modifier material is selected from the group consisting of a polymer, a fiber, an elastomeric particle, and a nanomaterial.

The mixing chamber 102 includes a pressure vessel 103 selected from the group consisting of a cylindrical pressure-rated vessel, a jacketed thermal-control vessel, a double-walled insulated vessel, and a composite-reinforced metal vessel. The pressure vessel 103 defines an enclosed internal volume configured to withstand elevated temperatures and pressures associated with asphalt processing.

The pressure vessel 103 may include heating or cooling interfaces and structural reinforcement to maintain mechanical integrity during operation of the system 100.

The mixing chamber 102 has an internal diameter 'D' in a range between 50 mm and 300 mm, preferably 60 and 280 mm, preferably 70 and 260 mm, preferably 80 and 240 mm, preferably 90 and 220 mm, and preferably 100 and 200 mm, a wall thickness 'T' in a range between 2.0 and 8.0 mm, preferably 2.5 and 7.5 mm, preferably 3.0 and 7.0 mm, preferably 3.5 and 6.5 mm, preferably 4.0 and 6.0 mm, and preferably 4.5 and 5.5 mm, and an internal coating. The internal coating is selected from the group consisting of a fluoropolymer lining, a ceramic reinforced epoxy, and a boron nitride coating.

The system 100 further includes a mixing mechanism 104 disposed within the mixing chamber 102. The mixing mechanism 104 is configured to impart controlled mechanical energy to the asphalt binder and modifier material, promoting uniform dispersion.

In some embodiments, the mixing mechanism 104 may be driven by an electric, hydraulic, or pneumatic drive system and may be operated at variable speeds, torque levels, or duty cycles to accommodate different asphalt binder viscosities, modifier types, and target dispersion levels.

In some embodiments, the mixing mechanism 104 is configured to impart coordinated mechanical, ultrasonic, and vibrational energy to the asphalt binder and modifier material. The mixing mechanism includes a coaxial high-shear rotor positioned at the center of the mixing chamber and mounted on a drive shaft aligned with the chamber's longitudinal axis. The rotor generates an annular shear zone characterized by high shear rates, extensional flow, and controlled turbulence. Surrounding the shear zone, the ultrasonic transducers generate an ultrasonic cavitation zone comprising microbubble formation, collapse, and acoustic streaming. The RAM unit superimposes a low-frequency vibrational field on both the shear and cavitation zones, enhancing particle breakup, modifier wetting, and dispersion uniformity. The spatial arrangement of the rotor, transducers, and RAM unit forms a multi-zone shear-acoustic mixing architecture in which mechanical shear, ultrasonic cavitation, and vibrational resonance interact constructively. The controller dynamically adjusts rotor speed, ultrasonic amplitude, transducer phase, and vibrational acceleration to maintain optimal dispersion conditions based on real-time sensing data from the multi-sensor array.

In some embodiments, operational parameters of the mixing mechanism 104, such as rotational speed, shear rate, or energy input, are adjusted in real time based on feedback from the quantification and monitoring components of the system 100 to ensure complete dispersion while minimizing thermal or mechanical degradation of the asphalt binder or modifier material.

Figure 1B:
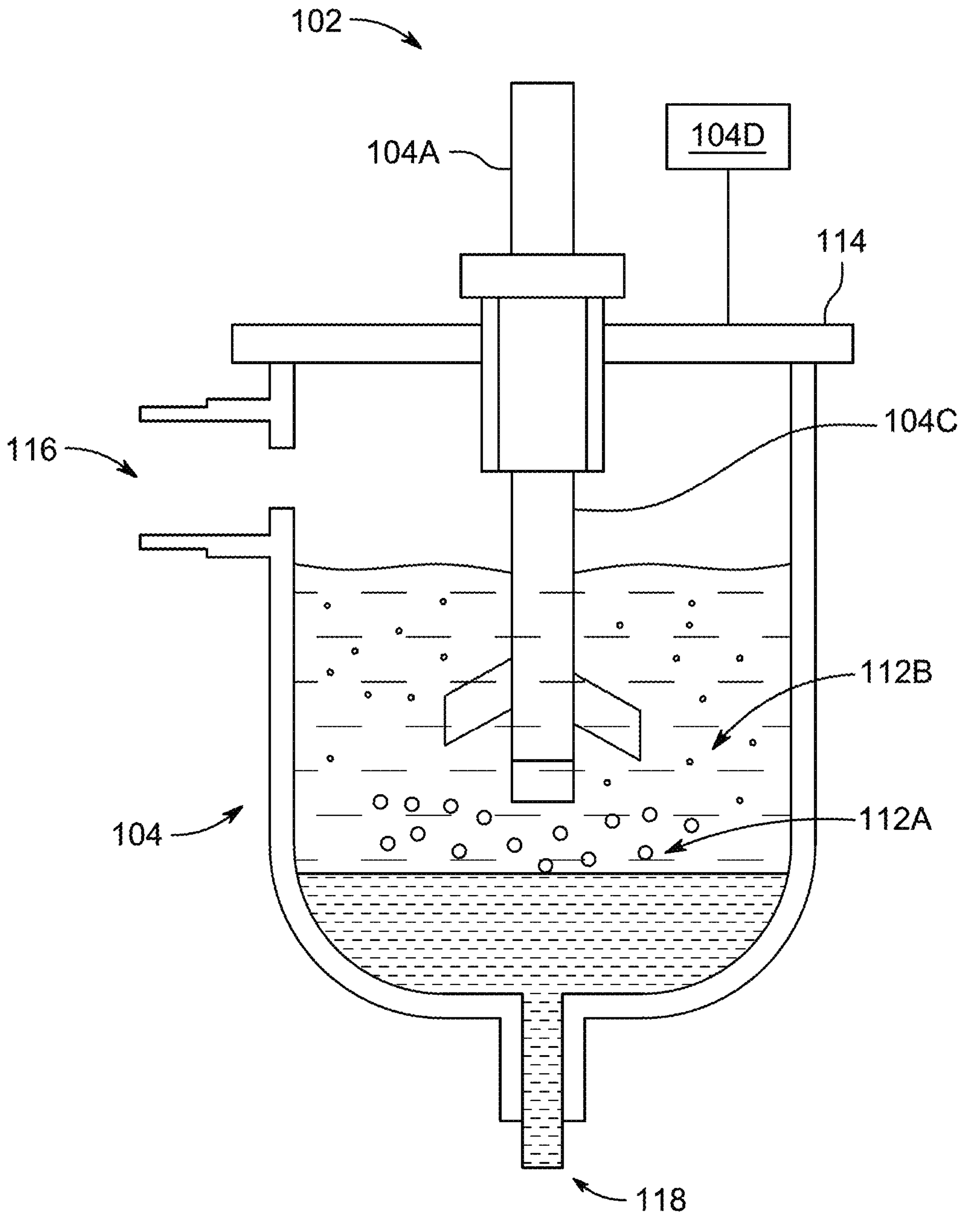
FIG. 1B is a schematic sectional view of a mixing chamber of the integrated dispersion and quantification system, according to certain embodiments.

As illustrated in FIG. 1A and FIG. 1B, the mixing mechanism 104 includes a coaxial high-shear rotor 104A aligned along a central longitudinal axis of the mixing chamber 102. The coaxial high-shear rotor 104A is configured to rotate relative to the mixing chamber 102, generating intense localized shear forces and controlled turbulence within the asphalt binder, thereby facilitating rapid breakup, wetting, and dispersion of the modifier material throughout the binder matrix.

In an embodiment, the coaxial high-shear rotor 104A may include a plurality of blades, slots, or perforations arranged circumferentially about a rotor body of the coaxial high-shear rotor 104A to promote extensional and radial flow patterns. The geometry, spacing, and surface features of the coaxial high-shear rotor 104A may be selected to set shear intensity and minimize excessive temperature rise or mechanical degradation of the asphalt binder and modifier.

The coaxial configuration of the high-shear rotor 104A enables uniform energy distribution across the cross-section of the mixing chamber 102 and reduces dead zones or stagnation regions within the mixing chamber 102. The rotational speed and operating profile of the coaxial high-shear rotor 104A may be dynamically controlled to generate and maintain a target dispersion quality and modifier concentration.

In some embodiments, the coaxial high-shear rotor is configured to generate intense localized shear forces, extensional flow, and controlled turbulence within the asphalt binder. The rotor is mounted on a drive shaft aligned with the longitudinal axis of the mixing chamber and includes a cylindrical or slotted rotor body with a diameter of approximately 20-120 mm and a length of about 30-150 mm. The rotor includes 12 to 48 shear teeth arranged circumferentially around its perimeter, with a tooth-tip clearance of approximately 50 to 500 μm relative to the chamber wall or stator surface. The rotor may include perforations, serrations, or angled slots to enhance extensional flow and promote rapid breakup of modifier agglomerates. During operation, the rotor generates shear rates of approximately 5,000-50,000 $s^{-1}$ within the annular shear zone, providing the primary mechanical dispersion force in the system.

The coaxial high-shear rotor 104A is formed from a composition selected from the group consisting of a stainless steel 316L, a hardened tool steel, a tungsten carbide-coated steel, a titanium alloy, and a ceramic-matrix composite alloy.

The coaxial high-shear rotor 104A has a rotor diameter between about 20 and 120 mm, preferably 30 and 110 mm, preferably 40 and 100 mm, preferably 50 and 90 mm, and preferably 60 and 80 mm, a rotor length between about 30 and 150 mm, preferably 40 and 140 mm, preferably 50 and 130 mm, preferably 60 and 120 mm, preferably 70 and 110 mm, and preferably 80 and 100 mm, and a rotor thickness between about 1.0 and 6.0 mm, preferably 1.5 and 5.5 mm, preferably 2.0 and 5.0 mm, preferably 2.5 and 5.5 mm, preferably 3.0 and 5.0 mm, and preferably 3.5 and 4.5 mm.

The coaxial high-shear rotor 104A includes between 12 and 48 shear teeth, preferably 13 and 46 shear teeth, preferably 14 and 44 shear teeth, preferably 15 and 42 shear teeth, preferably 16 and 40 shear teeth, and preferably 17 and 38 shear teeth, with a tooth tip clearance in a range between about 50 and 500 μm, preferably 60 and 450 μm, preferably 70 and 400 μm, preferably 80 and 350 μm, preferably 90 and 300 μm, and preferably 100 and 250 μm. The coaxial high-shear rotor 104A also has a surface roughness of Ra between 0.1 and 1.0 μm, preferably 0.2 and 0.9 μm, preferably 0.3 and 0.8 μm, preferably 0.4 and 0.7 μm, and preferably 0.5 and 0.6 μm, a thermal stability rating between about 80 and 200° C., preferably 90 and 190° C., preferably 100 and 180° C., preferably 110 and 170° C., preferably 120 and 160° C., and preferably 130 and 150° C., and an abrasion-resistant coating. The abrasion-resistant coating is selected from the group consisting of tungsten carbide, diamond-like carbon (DLC), and boron nitride-based coatings.

The mixing mechanism 104 further includes a plurality of ultrasonic transducers 104B positioned circumferentially around the mixing chamber 102. Each ultrasonic transducer 104B is mounted to an interior wall 102A of the mixing chamber 102.

In some embodiments, a plurality of ultrasonic transducers is arranged in a circumferential array around the mixing chamber. Each ultrasonic transducer comprises a piezoelectric or composite transduction element bonded to a sonotrode with a length of about 20 to 120 mm and a tip diameter of about 5 to 30 mm. The sonotrode is configured to provide an acoustic-gain factor between 2× and 10× through geometric amplification of displacement. A backing layer positioned behind the transduction element absorbs backward-propagating acoustic energy and stabilizes the transducer's mechanical response. A matching layer on the radiating surface matches the acoustic impedance of the transducer to that of the asphalt binder, improving transmission efficiency and reducing reflection losses. The transducers are mounted at angular intervals between about 10° and 90° and at axial elevations between about 5 and 60 mm above the chamber base. The transducers are driven by phase-shifted excitation signals having phase offsets between about 10° and 180°, enabling the generation of rotating, stationary, or swept-frequency sonication modes. The coordinated operation of the transducers produces a multi-directional sonication field and an ultrasonic cavitation zone surrounding the annular shear zone.

Each ultrasonic transducer 104B is configured to operate at a predetermined ultrasonic frequency and amplitude. The plurality of ultrasonic transducers 104B produces ultrasonic pressure waves that propagate through the asphalt binder and the modifier material contained within the mixing chamber 102.

The plurality of ultrasonic transducers 104B is configured to generate a multi-directional sonication field and an ultrasonic cavitation zone 112B (shown in FIG. 1B). The circumferential arrangement of the plurality of ultrasonic transducers 104B produces a multi-directional sonication field within the mixing chamber 102. The interaction of ultrasonic pressure waves within the asphalt binder and the modifier material forms the ultrasonic cavitation zone 112B within the internal processing volume of the mixing chamber 102. The ultrasonic cavitation zone 112B is characterized by the formation and collapse of microbubbles within the asphalt binder and the modifier material.

The system 100 further includes a multi-sensor array 106. The multi-sensor array 106 is configured to acquire and process data associated with the asphalt binder and the modifier material during operation of the system 100.

In some embodiments, the multi-sensor array 106 is configured to acquire real-time measurements of optical, rheological, acoustic, thermal, and mechanical properties of the asphalt-modifier mixture. The multi-sensor array 106 includes at least one of an optical sensor 106A, a torque sensor 106B, a viscosity sensor 106C, a temperature probe 106D, and an acoustic sensor 106E.

The optical sensor 106A is configured to detect optical characteristics of the asphalt binder and the modifier material. The torque sensor 106B is configured to measure the torque associated with the rotation of the mixing mechanism 104. The viscosity sensor 106C is configured to measure apparent viscosity under operating conditions. The temperature probe 106D is configured to measure the temperature of the asphalt binder. The acoustic sensor 106E is configured to detect acoustic emissions generated during mixing. The multi-sensing array 106 is further explained in FIG. 2C.

In some embodiments, the multi-sensing array is arranged along the inner wall of the mixing chamber in a vertically staggered configuration to capture spatial gradients in shear, temperature, viscosity, and acoustic activity. The sensors may be positioned at axial elevations spaced between about 10 and 80 mm apart, with the lowest sensor located within 5 to 20 mm of the annular shear zone.

In one embodiment, the sensors are arranged in a helical or spiral pattern around the chamber wall to maximize spatial coverage while minimizing flow disturbance. In another embodiment, the sensors are arranged in circumferential groups of two to six sensors at angular intervals between 30° and 120°, enabling multi-point sampling of optical scattering, acoustic emissions, and rheological properties. The placement geometry is selected to ensure that at least one sensor is positioned adjacent to the shear zone, one sensor is positioned within the ultrasonic cavitation zone, and one sensor is positioned within the bulk-flow region of the chamber.

In one embodiment, the sensors may be arranged in vertically staggered positions at axial elevations spaced between approximately 10 and 80 mm apart, and may be distributed circumferentially at angular intervals between approximately 30° and 120°. This arrangement ensures that at least one sensor is positioned adjacent to the annular shear zone, one sensor is positioned within the ultrasonic cavitation zone, and one sensor is positioned within the bulk-flow region of the chamber. The multi-sensor array provides continuous feedback to the controller to compute the Dispersion Uniformity Index (DUI), estimate modifier concentration, and adjust operational parameters.

In some embodiments, each sensor of the multi-sensing array is mounted within a recessed, thermally insulated port formed in the inner wall of the mixing chamber. Each port includes a cylindrical cavity with a depth of about 2 to 10 mm and an inner diameter of about 6 to 20 mm. The cavity is lined with a thermally insulating material, such as a ceramic-filled epoxy, polyimide, or aerogel-reinforced composite, to reduce thermal conduction from the asphalt binder to the sensor body. An acoustic-damping backfill material, such as silicone gel or a polyurethane elastomer, is applied behind the sensor to minimize mechanical vibration and isolate the sensing element from chamber-wall resonance. The sensor face is flush-mounted or slightly recessed relative to the chamber wall to minimize flow disruption. Electrical leads or optical fibers are routed through sealed feedthroughs to maintain pressure integrity. The mounting configuration ensures stable sensor operation under high-temperature, high-viscosity, and high-vibration conditions typical of asphalt modification processes.

The system 100 further includes a controller 108 operatively coupled to the mixing mechanism 104 and the multi-sensor array 106. The controller 108 may include a processor and a memory storing executable instructions. The controller 108 is configured to receive sensing data generated by the multi-sensor array 106 during operation of the system 100.

In some embodiments, the controller is operatively coupled to the mixing mechanism and the multi-sensor array and is configured to execute real-time control algorithms that regulate shear-vortex strength, ultrasonic cavitation energy, vibrational acceleration, and transducer excitation phase. The controller receives sensing data from the multi-sensor array, including optical transmittance, torque, viscosity, temperature, and acoustic-emission measurements, and computes a Dispersion Uniformity Index (DUI) using a weighted combination of normalized sensing parameters.

The controller dynamically adjusts rotor speed, ultrasonic drive amplitude, transducer phase offsets, and RAM unit drive frequency based on deviations between the measured DUI and a target DUI range. The controller may implement proportional-integral-derivative (PID) control, model predictive control (MPC), resonance tracking algorithms, or rule-based logic to maintain optimal dispersion conditions. The controller also computes modifier concentration using optical, rheological, acoustic, and torque-based estimation models and may fuse these estimates using weighted-least-squares or Kalman-filter-based algorithms. The controller communicates with a data-logging module that records sensing data, operational parameters, and energy usage for each mixing cycle.

The controller 108 is configured to determine a dispersion quality via a Dispersion Uniformity Index (DUI) based on sensing data from the multi-sensor array 106. The controller 108 is further configured to activate or deactivate at least one component of the mixing mechanism 104 in response to the DUI. The sensing data includes one or more measured parameters obtained from the optical sensor 106A, the torque sensor 106B, the viscosity sensor 106C, the temperature probe 106D, and the acoustic sensor 106E. The Dispersion Uniformity Index represents a quantitative measure of spatial and temporal uniformity of the modifier material within the asphalt binder.

The controller 108 is further configured to compare the DUI to one or more predefined threshold values stored in the memory. Based on the comparison, the controller 108 is configured to activate or deactivate at least one component of the mixing mechanism 104. Activation or deactivation includes initiating, suspending, or modifying the operation of the coaxial high-shear rotor 104A or the plurality of ultrasonic transducers 104B.

The controller 108 is further configured to adjust one or more of the shear-vortex strength generated by the coaxial high-shear rotor 104A, the ultrasonic cavitation energy generated by the ultrasonic transducers 104B, the vibrational acceleration, and the acoustic resonance condition within the mixing chamber 102.

In some embodiments, the shear-vortex strength is defined as a shear-rate-derived metric representing the combined effect of rotor-tip velocity, rotor diameter, and tooth-tip clearance. The shear-vortex strength Sy may be computed according to:

$$S_v = \frac{V_{tip}}{\delta}$$

where $V_{tip}$ is the rotor-tip velocity and Sis the tooth-tip clearance. In another embodiment, the shear-vortex strength is defined as the magnitude of vorticity within the annular shear zone 112A, computed from torque measurements and rotor geometry. The controller 108 uses the shear-vortex strength as a real-time indicator of mechanical dispersion intensity.

In some embodiments, the ultrasonic cavitation energy is quantified using an acoustic-emission-based cavitation index. The cavitation index is derived from the root-mean-square (RMS) amplitude of broadband acoustic emissions detected by the acoustic sensor 106E over a frequency range of about 20 to 120 kHz. In another embodiment, cavitation energy is inferred from the electrical power delivered to the ultrasonic transducers 104B, after correcting for transducer efficiency and acoustic impedance matching. In yet another embodiment, cavitation energy is computed from the spectral density of high-frequency pressure fluctuations measured within the ultrasonic cavitation zone 112B. The controller 108 converts the measured cavitation index into a cavitation energy value expressed in W/cm$^2$ using calibration constants stored in memory.

In some embodiments, the controller dynamically computes operational parameters for the mixing mechanism based on real-time sensing data and predefined performance targets. The controller determines a target shear-vortex strength $$S_v^{*}$$

using:

$$S_v^{*} = S_{v,0} + K_s \cdot (DUI_t - DUI)$$

where $S_{v,0}$ is a baseline shear setting, $K_s$ is a proportional gain constant, $DUI_t$ is a target Dispersion Uniformity Index, and DUI is the measured value. Ultrasonic cavitation energy $E_{ultra}$ is adjusted according to:

$$E_{ultra}^{*} = E_{ultra,0} + K_u \cdot (1 - \eta_{norm})$$

where $E_{ultra,0}$ is a baseline ultrasonic energy level and $K_u$ is a gain factor. Vibrational acceleration generated by the RAM unit is computed using a resonance-tracking algorithm that adjusts the drive frequency toward the measured resonant frequency $f_r$ of the spring-mass subsystem. The controller may also compute a synchronization parameter $\Delta\phi$ representing the phase difference between shear oscillations and ultrasonic pressure oscillations, and adjust transducer phase offsets to maintain $|\Delta\phi| < \Delta\phi_{max}$. These calculations enable the system to maintain optimal dispersion conditions throughout the mixing cycle.

The system 100 further includes a data-logging module 110 operatively coupled to the controller 108. The data-logging module 110 is configured to generate a digital record of the dispersion quality, the sensing data, and energy usage for a mixing cycle.

The digital record includes dispersion quality data represented by the DUI determined by the controller 108, sensing data acquired from the multi-sensor array 106, and energy usage data associated with the operation of the mixing mechanism 104. The energy usage data includes electrical power consumption of the coaxial high-shear rotor 104A and the plurality of ultrasonic transducers 104B during the mixing cycle.

As illustrated in FIG. 1B, the high-shear rotor 104A is disposed at the center of the mixing chamber 102 and mounted on a drive shaft 104C. The drive shaft 104C is aligned with the longitudinal axis of the mixing chamber 102. The drive shaft 104C is mechanically coupled to a drive assembly associated with the mixing mechanism 104 and is configured to transmit rotational motion to the high-shear rotor 104A.

In some embodiments, the high-shear rotor 104A is configured to generate intense localized shear forces within the asphalt binder to promote rapid breakup of modifier particles and uniform dispersion. The rotor is coaxially aligned with the mixing chamber and includes a cylindrical or slotted rotor body having a diameter between about 20 and 120 mm and a length between about 30 and 150 mm. The rotor includes between 12 and 48 shear teeth arranged circumferentially around its perimeter, with a tooth-tip clearance between about 50 and 500 μm relative to the chamber wall or stator surface. The rotor may include perforations, slots, or serrated edges to enhance extensional flow and turbulence generation. The rotor is made of abrasion-resistant materials such as 316L stainless steel, hardened tool steel, tungsten-carbide-coated steel, titanium alloys, or ceramic-matrix composites. The rotor surface may include a coating such as tungsten carbide, diamond-like carbon (DLC), or boron-nitride-based materials to improve wear resistance and thermal stability. During operation, the rotor generates shear rates of about 5,000-50,000 $s^{-1}$ within the annular shear zone, providing the primary mechanical dispersion force in the system.

The plurality of ultrasonic transducers 104B is mounted circumferentially around the mixing chamber 102. Each ultrasonic transducer of the plurality of ultrasonic transducers 104B is radially oriented to direct ultrasonic energy inward toward the high-shear rotor 104A and towards an annular shear zone 112A surrounding the high-shear rotor 104A.

The annular shear zone 112A is defined by a region of interaction between rotational motion generated by the high-shear rotor 104A and ultrasonic energy generated by the plurality of ultrasonic transducers 104B. The circumferential and radial arrangement of the plurality of ultrasonic transducers 104B provides spatial overlap between ultrasonic energy and mechanical shear within the annular shear zone 112A during operation of the system 100.

The system 100 further includes a resonant acoustic mixing (RAM) unit 104D configured to generate a vibrational acceleration and an acoustic resonance. The RAM unit 104D is configured to transmit vibrational energy to the mixing chamber 102.

In some embodiments, the resonant acoustic mixing (RAM) unit is configured to generate controlled low-frequency vibrational energy that couples into the mixing chamber to enhance dispersion, breakup of agglomerates, and modifier wetting. The RAM unit includes a counter-oscillating mass assembly comprising a first oscillating mass and a second oscillating mass configured to move in opposite directions along a common oscillation axis to generate a net vibrational force. An electromechanical actuator, such as a voice-coil actuator, linear motor, or eccentric-mass motor, imparts reciprocating motion to the oscillating masses. The RAM unit further includes a spring-mass resonance subsystem comprising one or more spring elements selected from coil springs, elastomeric isolators, and leaf springs. The spring-mass subsystem is configured to operate at or near its natural resonant frequency, thereby amplifying vibrational displacement and increasing vibrational acceleration transmitted to the mixing chamber. The RAM unit is mechanically coupled to the exterior of the mixing chamber through a rigid mounting frame that transmits vibrational energy into the chamber walls. The controller dynamically adjusts the RAM unit's drive frequency, amplitude, and duty cycle to maintain resonance conditions and to synchronize vibrational energy with shear and ultrasonic fields.

The RAM unit 104D is mechanically coupled to the exterior of the mixing chamber 102 through a mounting frame 114. The mounting frame 114 provides structural support and transmits vibrational energy from the resonant acoustic mixing unit 104D to the mixing chamber 102. Transmission of the vibrational energy induces oscillatory motion within the mixing chamber 102 and within the asphalt binder and the modifier material contained in the mixing chamber 102.

The resonant acoustic mixing unit 104D is operatively coupled to the controller 108. The controller 108 is configured to control activation, frequency, amplitude, and duty cycle of the resonant acoustic mixing unit 104D.

In an embodiment, the high-shear rotor 104A, the plurality of ultrasonic transducers 104B, and the RAM unit 104D are spatially arranged to form a shear-acoustic mixing architecture. The shear-acoustic mixing architecture is defined by coordinated spatial placement and operational interaction of the mixing mechanism 104 components within the mixing chamber 102.

The shear-acoustic mixing architecture includes the annular shear zone 112A generated by the high-shear rotor 104A, the ultrasonic cavitation zone 112B surrounding the annular shear zone 112A. The shear-acoustic mixing architecture includes a low-frequency vibrational field superimposed on the shear and ultrasonic cavitation zones by the RAM unit 104D. The low-frequency vibrational field is transmitted to the mixing chamber 102 through the mounting frame 114 and is superimposed on the shear zone and the ultrasonic cavitation zone. The combined presence of mechanical shear, ultrasonic cavitation, and low-frequency vibration defines the shear-acoustic mixing architecture within the mixing chamber 102.

The shear-acoustic mixing architecture includes the ultrasonic transducers 104B positioned at a radial distance between about 5 and 25 mm, preferably 6 and 24 mm, preferably 7 and 23 mm, preferably 8 and 22 mm, preferably 9 and 21 mm, and preferably 10 and 20 mm, from an outer perimeter of the high-shear rotor 104A. The shear zone 112A has a radial thickness in a range between about 2.0 and 10 mm, preferably 2.5 and 9.5 mm, preferably 3.0 and 9.0 mm, preferably 3.5 and 8.5 mm, preferably 4.0 and 8.0 mm, and preferably 4.5 and 7.5 mm.

The ultrasonic cavitation zone 112B extends radially outward from the shear zone 112A by between about 3 and 20 mm, preferably 4 and 19 mm, preferably 5 and 18 mm, preferably 6 and 17 mm, preferably 7 and 16 mm, and preferably 8 and 15 mm, and the low-frequency vibrational field is aligned along a principal vibrational axis oriented parallel to the longitudinal axis of the mixing chamber 102.

In an embodiment, the mixing mechanism 104 is configured to operate within predetermined processing ranges during operation of the system 100. The mixing mechanism 104 is configured to produce an effective shear rate between about 5,000 and 50,000 $s^{-1}$, preferably 6,000 and 40,000 $s^{-1}$, preferably 7,000 and 30,000 $s^{-1}$, preferably 8,000 and 20,000 $s^{-1}$, preferably 9,000 and 10,000 $s^{-1}$, within the annular shear zone 112A.

In some embodiments, the combined mechanical-ultrasonic-acoustic energy density is computed as:

$$E_{density} = \frac{P_{mech} + P_{ultra} + P_{vib}}{V_{mix}}$$

where $P_{mech}$ is mechanical power delivered by the high-shear rotor 104A, $P_{ultra}$ is acoustic power delivered by the ultrasonic transducers 104B, $P_{vib}$ is vibrational power transmitted by the RAM unit 104D, and $V_{mix}$ is the internal volume of the mixing chamber 102.

The mixing mechanism 104 is further configured to operate at a combined mechanical-ultrasonic-acoustic energy density between about 0.5 and 5.0 kW/L, preferably 0.6 and 4.5 kW/L, preferably 0.7 and 4.0 kW/L, preferably 0.8 and 3.5 kW/L, preferably 0.9 and 3.0 kW/L, and preferably 1.0 and 2.5 kW/L. The combined mechanical-ultrasonic-acoustic energy density includes mechanical energy imparted within the annular shear zone 112A by the high-shear rotor 104A, ultrasonic energy imparted within an ultrasonic cavitation zone 112B by the plurality of ultrasonic transducers 104B, and vibrational energy imparted to the mixing chamber 102 by the resonant acoustic mixing unit 104D.

The mixing mechanism 104 is further configured to operate at a shear-to-ultrasonic energy ratio between about 1:0.1 and 1:1. The shear-to-ultrasonic energy ratio is defined as the ratio of the mechanical energy associated with the annular shear zone 112A to the ultrasonic energy associated with the ultrasonic cavitation zone 112B.

In some embodiments, the low-frequency vibrational coupling efficiency is defined as:

$$\eta_{vib} = \frac{E_{transmitted}}{E_{input}}$$

where $E_{input}$ is the electrical or mechanical energy supplied to the RAM unit 104D and $E_{transmitted}$ is the vibrational energy measured at the mixing chamber 102 using accelerometers or acoustic sensors. The controller 108 uses coupling efficiency to adjust RAM unit parameters to maintain consistent vibrational field strength.

The mixing mechanism 104 is further configured to operate at a low-frequency vibrational coupling efficiency between about 60% and 95%, preferably 65% and 90%, preferably 70% and 85%, and preferably 75% and 80%. The low-frequency vibrational coupling efficiency is defined as the ratio of the vibrational energy transmitted to the mixing chamber 102 to the input energy of the RAM unit 104D.

The mixing mechanism 104 is further configured to operate at a mixing-zone residence time between about 1 and 30s, preferably 3 and 28s, preferably 5 and 26s, preferably 7 and 24s, preferably 9 and 22s, and preferably 10 and 20s per circulation cycle. The mixing-zone residence time is defined as a duration during which an asphalt binder and a modifier material remain within a combined region defined by the annular shear zone 112A and the ultrasonic cavitation zone 112B during a single circulation cycle.

In some embodiments, the mixing zone residence time is estimated using flow circulation models based on rotor geometry, chamber volume, and measured torque. In another embodiment, residence time is inferred from tracer-based optical measurements or acoustic time-of-flight analysis. The controller 108 ensures that each circulation cycle meets the minimum residence time required for complete dispersion.

TABLE 1

Mixing Performance Benchmarks

| Mix Type | Additive Type | Baseline Shear Speed (rpm) | Ultrasonic Power (W) | Final DUI | Mixing Time (min) |
|---|---|---|---|---|---|
| PMA-1 | SBS polymer | 4000 | 600 | 0.96 | 12 |
| PMA-2 | Crumb rubber | 6000 | 700 | 0.93 | 15 |
| NMA-1 | Nanoclay | 5000 | 800 | 0.97 | 10 |
| NMA-2 | Graphene oxide | 5500 | 750 | 0.98 | 9 |
| FMA-1 | Cellulose fiber | 3000 | 400 | 0.94 | 14 |

In an embodiment, Table 1 summarizes representative mixing performance attained using the integrated dispersion and quantification system 100 for different asphalt modifier types. The table correlates additive type, baseline shear speed, ultrasonic power input, final DUI, and mixing time.

Polymer-modified asphalt formulations PMA-1 and PMA-2, processed with shear speeds between about 4,000 and 6,000 rpm and ultrasonic power between about 600 and 700 W, attain final DUI values of 0.96 and 0.93 with mixing times of approximately 12 to 15 minutes. Nanomaterial-modified formulations NMA-1 and NMA-2, operated at shear speeds between about 5,000 and 5,500 rpm and ultrasonic power between about 750 and 800 W, attain higher DUI values of 0.97 and 0.98 with reduced mixing times of approximately 9 to 10 minutes. Fiber-modified asphalt formulation FMA-1 attains a DUI of 0.94 at a shear speed of approximately 3,000 rpm and an ultrasonic power of approximately 400 W with a mixing time of about 14 minutes.

In an embodiment, the multi-sensor array 106 is disposed along the inner wall 102A of the mixing chamber 102 at about 1.0 to 10, preferably 1.5 to 9, preferably 2.0 to 8, preferably 2.5 to 7, preferably 3.0 to 6, and preferably 3.5 to 5 circumferential positions. In another embodiment, the multi-sensor array 106 is disposed at multiple axial elevations spaced between about 10 and 80 mm, preferably 20 and 75 mm, preferably 30 and 70 mm, preferably 40 and 65 mm, and preferably 50 and 60 mm apart. In yet another embodiment, the multi-sensor array 106 is positioned within about 5 to 20 mm, preferably 6 to 19 mm, preferably 7 to 18 mm, preferably 8 to 17 mm, preferably 9 to 16 mm, and preferably 10 to 15 mm, of the annular shear zone 112A.

Each sensor of the multi-sensor array 106 is mounted within a thermally insulated port (not shown). The thermally insulated port includes a depth between 2 and 10 mm, preferably 2.5 and 9 mm, preferably 3.0 and 8 mm, preferably 3.5 and 7 mm, preferably 4.0 and 6 mm, and preferably 4.5 and 5 mm, and an inner diameter between 6 and 20 mm, preferably 7 and 19 mm, preferably 8 and 18 mm, preferably 9 and 17 mm, preferably 10 and 16 mm, and preferably 11 and 15 mm.

Each thermally insulated port includes a thermally insulating liner selected from the group consisting of ceramic-filled epoxy, polyimide, and aerogel-reinforced composite. Each thermally insulated port further includes an acoustic-damping backfill selected from the group consisting of silicone gel and polyurethane elastomer. Each sensor in the multi-sensor array 106 is encapsulated with a coating selected from the group consisting of a high-temperature fluoropolymer coating, a ceramic-reinforced epoxy encapsulant, a silicone-polyimide elastomer, and a boron nitride-filled polymer composite.

Figure 2A:
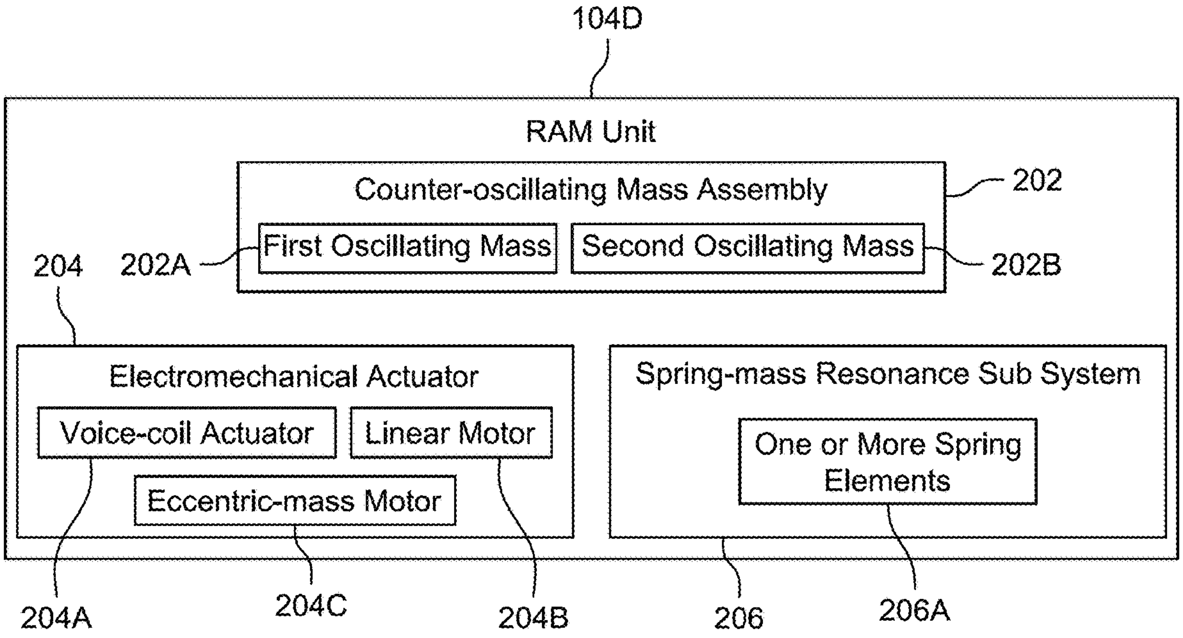
FIG. 2A is a schematic block diagram showing structural elements of a resonant acoustic mixing (RAM) unit of the integrated dispersion and quantification system, according to certain embodiments.

Referring to FIG. 2A, a schematic block diagram showing structural elements of the RAM unit 104D of the integrated dispersion and quantification system is illustrated, according to certain embodiments.

The RAM unit 104D includes a counter-oscillating mass assembly 202. The counter-oscillating mass assembly 202 includes a first oscillating mass 202A and a second oscillating mass 202B. The first oscillating mass 202A and the second oscillating mass 202B are configured to move in opposite directions along a common oscillation axis.

The first oscillating mass 202A and the second oscillating mass 202B may be mechanically coupled to a drive mechanism associated with the RAM unit 104D. The drive mechanism may be configured to impart reciprocating motion to the first oscillating mass 202A and the second oscillating mass 202B at a predetermined oscillation frequency. The counter-directional movement of the first oscillating mass 202A and the second oscillating mass 202B produces a net vibrational force transmitted through the mounting frame 114 to the mixing chamber 102.

The RAM unit 104D further includes an electromechanical actuator 204. The electromechanical actuator 204 may be configured to impart oscillatory motion to the first oscillating mass 202A and the second oscillating mass 202B along the common oscillation axis.

The electromechanical actuator 204 includes at least one of a voice-coil actuator 204A, a linear motor 204B, and an eccentric-mass motor 204C. The voice-coil actuator 204A may be configured to generate linear reciprocating motion of the counter-oscillating mass assembly 202 in response to an electrical drive signal. The linear motor 204B may be configured to generate direct linear motion of the counter-oscillating mass assembly 202 along the common oscillation axis. The eccentric-mass motor 204C may be configured to generate oscillatory motion through rotational imbalance transmitted to the counter-oscillating mass assembly 202.

The RAM unit 104D further includes a spring-mass resonance subsystem 206. The spring-mass resonance subsystem 206 includes one or more spring elements 206A selected from the group consisting of coil springs, elastomeric isolators, and leaf springs.

The spring-mass resonance subsystem 206 may be configured to establish a resonant condition for oscillatory motion generated by the electromechanical actuator 204.

The RAM unit 104D is configured to provide a vibrational acceleration of about 10 to 100 g, preferably 20 to 95 g, preferably 30 to 90 g, preferably 40 to 85 g, preferably 50 to 180 g, and preferably 60 to 75 g, transmitted to the mixing chamber 102 through the mounting frame 114. The RAM unit 104D is configured to generate a stroke amplitude of about 0.1 to 5.0 mm, preferably 0.4 to 4.8 mm, preferably 0.7 to 4.6 mm, preferably 1.0 to 4.4 mm, preferably 1.2 to 4.2 mm, and preferably 1.4 to 4.0 mm.

The RAM unit 104D is configured to generate the acoustic resonance of about 10 to 1000 Hz, preferably 30 to 900 Hz, preferably 50 to 800 Hz, preferably 70 to 700 Hz, preferably 90 to 600 Hz, and preferably 100 to 500 Hz, with a resonance amplitude of about 0.1 to 2 mm, preferably 0.3 to 1.8 mm, preferably 0.5 to 1.6 mm, preferably 0.7 to 1.4 mm, and preferably 0.9 to 1.2 mm. The RAM unit 104D is configured to generate an input electrical power rating of about 100 to 2,000 W, preferably 200 to 1900 W, preferably 300 to 1800 W, preferably 400 to 1700 W, preferably 500 to 1600 W, and preferably 600 to 1500 W.

Figure 2B:
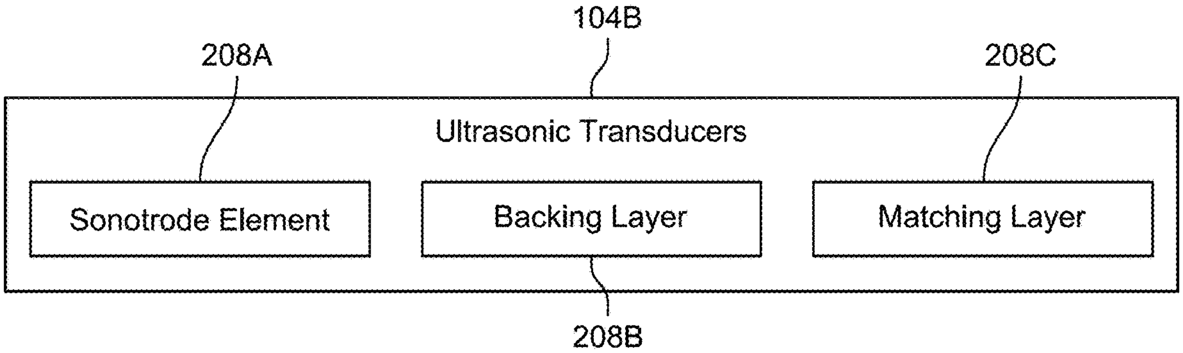
FIG. 2B is a schematic block diagram showing structural elements of an ultrasonic transducer, according to certain embodiments.

Referring to FIG. 2B, a schematic block diagram showing structural elements of the ultrasonic transducers 104B is illustrated, according to certain embodiments.

The plurality of ultrasonic transducers 104B includes a sonotrode element 208A. The sonotrode element 208A has a length between 20 and 120 mm, preferably 30 and 110 mm, preferably 35 and 100 mm, 40 and 90 mm, preferably 45 and 80 mm, and preferably 50 and 70 mm, and a tip diameter between 5 and 30 mm, preferably 6 and 28 mm, preferably 7 and 26 mm, preferably 8 and 24 mm, preferably 9 and 22 mm, and preferably 10 and 20 mm. The sonotrode element 208A is configured to provide an acoustic gain factor between 2.0× and 10×, preferably 2.5× and 9.5×, preferably 3.0× and 9.0×, preferably 3.5× and 8.5×, preferably 4.0× and 8.0×, and preferably 4.5× and 7.5×. The acoustic gain factor is based on geometric amplification of ultrasonic displacement along the length of the sonotrode element 208A.

The plurality of ultrasonic transducers 104B further includes a backing layer 208B. The backing layer 208B is constructed from a material selected from the group consisting of tungsten, steel, and an epoxy tungsten composite. The selected materials have an acoustic impedance between 20 and 100 Mrayl, preferably 30 and 95 Mrayl, preferably 40 and 90 Mrayl, preferably 50 and 85 Mrayl, preferably 60 and 80 Mrayl, and preferably 70 and 75 Mrayl.

The plurality of ultrasonic transducers 104B further includes a matching layer 208C. The matching layer 208C is constructed using a material selected from the group including alumina, silica epoxy composite, and polymer ceramic laminate. The matching layer has a thickness of about 0.1 to 1.0 mm, preferably 0.2 to 0.9 mm, preferably 0.3 to 0.8 mm, preferably 0.4 to 0.7 mm, and preferably 0.5 to 0.6 mm, and is configured to mediate acoustic transmission between the sonotrode element 208A and the asphalt binder.

In an embodiment, the plurality of ultrasonic transducers 104B is disposed in a circumferential array around the mixing chamber 102 at angular intervals between about 10° and 90°, preferably 15° and 85°, preferably 20° and 80°, preferably 25° and 75°, and preferably 30° and 70°, 35° and 65°.

In an embodiment, a surround field configuration is configured to generate rotating, stationary, and swept frequency sonication modes in a range between 10 and 50 kHz, preferably 15 and 45 kHz, preferably 20 and 40 kHz, and preferably 25 and 35 kHz. The sonication modes are defined by the spatial and temporal interaction of ultrasonic pressure waves generated by the plurality of ultrasonic transducers 104B within the ultrasonic cavitation zone 112B.

In another embodiment, the plurality of ultrasonic transducers 104B is disposed at an axial elevation between 5 and 60 mm, preferably 6 and 58 mm, preferably 7 and 56 mm, preferably 8 and 54 mm, preferably 9 and 52 mm, and preferably 10 and 50 mm, above a base 120 of the mixing chamber 102. The axial elevation positions the plurality of ultrasonic transducers 104B in proximity to the annular shear zone 112A generated by the high-shear rotor 104A.

The ultrasonic transducers are driven by a phase-shifted excitation signal with phase offsets of about 10° to 180°, preferably 20° to 170°, preferably 30° to 160°, preferably 40° to 150°, preferably 50° to 140°, preferably 60° to 150°, and preferably 70° to 140°, between adjacent ultrasonic transducers of the plurality of ultrasonic transducers 104B. The phase offsets define a controlled acoustic field distribution within the mixing chamber 102 during operation of the system 100.

Figure 2C:
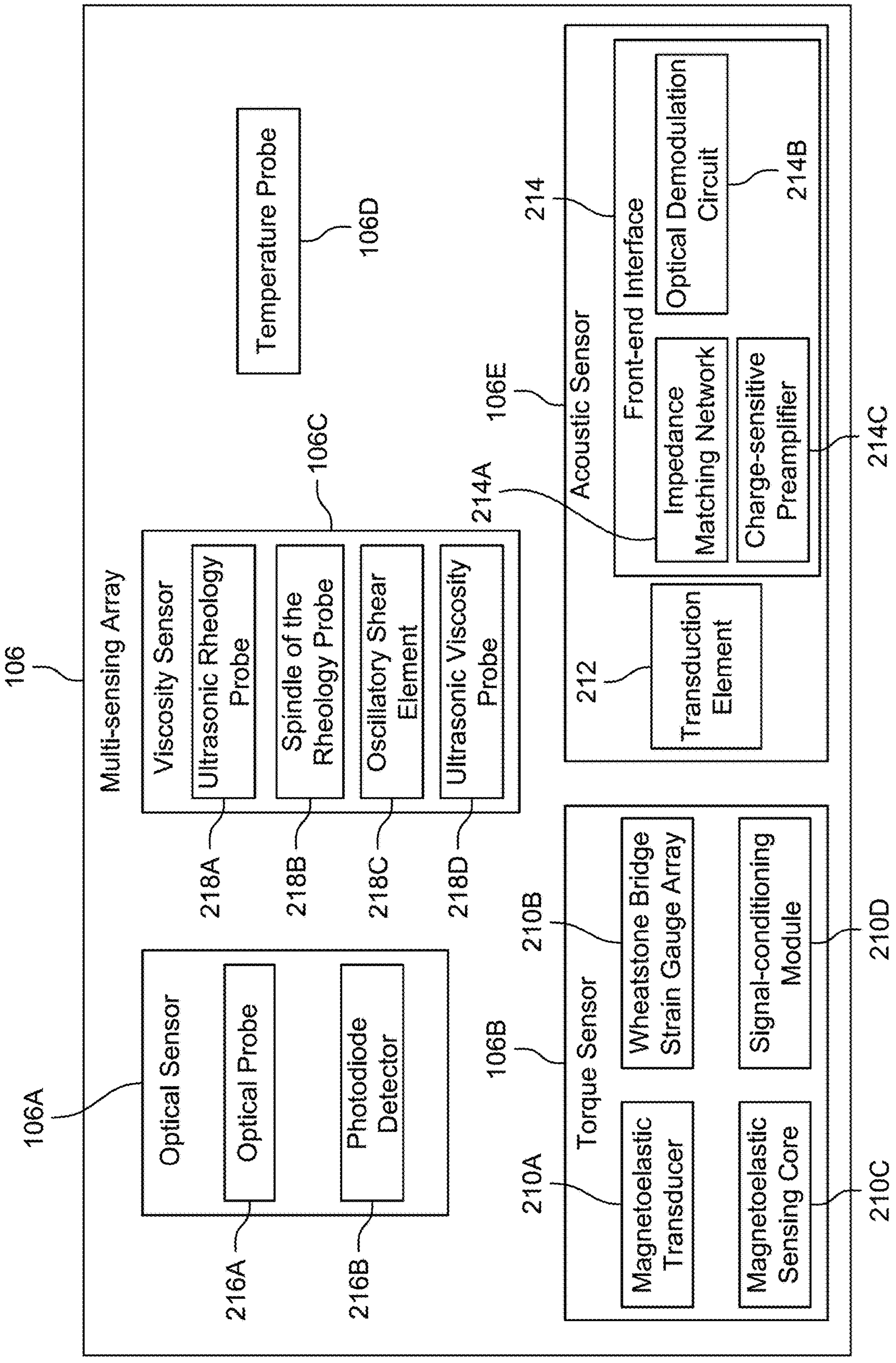
FIG. 2C is a schematic block diagram showing structural elements of a multi-sensing array, according to certain embodiments.

Referring to FIG. 2C, a schematic block diagram showing structural elements of the multi-sensing array 106 is illustrated, according to certain embodiments.

In an embodiment, the optical sensor 106A of the multi-sensing array 106 is selected from the group consisting of a hyperspectral microarray, a tunable-wavelength MEMS filter, and a dual-wavelength scattering probe.

The optical sensor 106A includes an optical probe 216A configured to operate over a wavelength range between about 400 and 900 nm, preferably 450 and 850 nm, preferably 500 and 800 nm, and preferably 600 and 750 nm. The optical probe 216A operates at a sampling rate between about 10 and 200 Hz, preferably 20 and 180 Hz, preferably 30 and 160 Hz, preferably 40 and 140 Hz, preferably 50 and 120 Hz, and preferably 60 and 100 Hz. The optical sensor 106A further includes a collimated illumination beam. The collimated illumination beam has a spot diameter between about 0.5 and 3.0 mm, preferably 0.6 and 2.8 mm, preferably 0.7 and 2.6 mm, preferably 0.8 and 2.4 mm, preferably 0.9 and 2.2 mm, and preferably 1.0 and 2.0 mm.

The optical sensor 106A further includes a photodiode detector 216B positioned to receive optical signals returned from the asphalt binder and the modifier material. The photodiode detector 216B has a responsivity between about 0.1 and 0.9 A/W, preferably 0.2 and 0.8 A/W, preferably 0.3 and 0.7 A/W, and preferably 0.4 and 0.6 A/W. The optical sensor 106A defines an optical path length between about 1.0 and 10 mm, preferably 1.5 and 9.5 mm, preferably 2.0 and 9.0 mm, preferably 2.5 and 8.5 mm, preferably 3 and 8.0 mm, preferably 3.5 and 7.5 mm, and preferably 4 and 7.0 mm.

The optical sensor 106A has a spectral resolution between about 2 and 20 nm, preferably 3 and 18 nm, preferably 4 and 16 nm, preferably 5 and 14 nm, preferably 6 and 12 nm, and preferably 7 and 10 nm, and a signal-to-noise ratio between about 40 and 80 dB, preferably 45 and 75 dB, preferably 50 and 70 dB, and preferably 55 and 65 dB. The optical sensor 106A also has an optical dynamic range between about 60 and 120 dB, preferably 65 and 110 dB, preferably 70 and 100 dB, preferably 75 and 90 dB, and preferably 80 and 90 dB, and an optical transmittance stability within about 0.5% over a 10-minute interval.

In an embodiment, the torque sensor 106B includes a magnetoelastic transducer 210A configured to measure torque between about 0.1 and 5.0 N·m, preferably 0.3 and 5 N·m, preferably 0.5 and 5 N·m, preferably 0.7 and 5 N·m, preferably 0.9 and 5 N·m, and preferably 1.0 and 5 N·m.

The torque sensor 106B further includes a Wheatstone-bridge strain-gauge array 210B. The Wheatstone bridge strain gauge array 210B includes strain gauges with gauge factors between about 1.0 and 2.5, preferably 1.2 and 2.5, preferably 1.4 and 2.5, preferably 1.6 and 2.5, preferably 1.8 and 2.5, and preferably 2.0 and 2.5. Deformation of the torque-transmitting element produces a corresponding electrical output from the Wheatstone bridge strain gauge array 210B.

The torque sensor 106B further includes a magnetoelastic sensing core 210C with permeability variation sensitivity between about 0.5 and 3%/MPa, preferably 0.5 and 3%/MPa, preferably 0.5 and 3%/MPa, preferably 0.5 and 3%/MPa, preferably 0.5 and 3%/MPa, and preferably 0.5 and 3%/MPa.

The torque sensor 106B further includes a signal-conditioning module 210D operatively coupled to the Wheatstone bridge strain-gauge array 210B and the magnetoelastic transducer 210A. The signal-conditioning module is configured to amplify an output of the Wheatstone bridge strain gauge array 210B using a low-noise amplifier having an input-referred noise below about 20 nV/√Hz. The signal-conditioning module is further configured to apply a low-pass filter having a cutoff frequency between about 10 and 500 Hz, preferably 30 and 450 Hz, preferably 50 and 400 Hz, preferably 70 and 350 Hz, preferably 80 and 300 Hz, and preferably 100 and 250 Hz. The signal-conditioning module is further configured to apply a notch filter tuned to attenuate frequencies between about 10 and 100 Hz, preferably 15 and 90 Hz, preferably 20 and 80 Hz, preferably 25 and 70 Hz, preferably 30 and 60 Hz, and preferably 35 and 50 Hz.

In an embodiment, the viscosity sensor 106C of the multi-sensor array 106 is selected from the group consisting of a piezo-oscillatory microviscometer, a MEMS shear-mode resonator, and an ultrasonic attenuation-based viscosity analyzer.

The viscosity sensor 106C includes an ultrasonic rheology probe 218A configured to measure apparent viscosity within a range between about 0.1 and 50 Pa·s, preferably 0.5 and 48 Pa·s, preferably 1.0 and 46 Pa·s, preferably 1.5 and 44 Pa·s, preferably 2.0 and 42 Pa·s, and preferably 2.5 and 40 Pa·s.

The viscosity sensor 106C further includes a spindle of the rheology probe 218B having a spindle diameter in a range between 3 mm and 15 mm and a length in a range between about 10 and 40 mm, preferably 12 and 38 mm, preferably 14 and 36 mm, preferably 16 and 34 mm, preferably 18 and 32 mm, and preferably 20 and 30 mm.

The viscosity sensor 106C further includes an oscillatory shear element 218C configured to operate at frequencies between 1 and 200 Hz, preferably 10 and 180 Hz, preferably 20 and 160 Hz, preferably 30 and 140 Hz, preferably 40 and 120 Hz, and preferably 50 and 100 Hz, with shear strain amplitudes between 0.1 and 10%, preferably 0.2 and 9%, preferably 0.4 and 8%, preferably 0.6 and 7%, and preferably 0.8 and 6%, 1.0 and 5%, relative to a nominal shear gap between the spindle and the asphalt binder.

The viscosity sensor 106C further includes an ultrasonic viscosity probe 218D operating at frequencies in a range between 1.0 and 10 MH, preferably 1.5 and 9 MH, preferably 2.0 and 8 MH, preferably 2.5 and 7 MH, preferably 3.0 and 6 MH, and preferably 3.5 and 5 MH, with an acoustic path length in a range between about 1.0 and 8.0 mm, preferably 1.5 and 7.5 mm, preferably 2.0 and 7.0 mm, preferably 2.5 and 6.5 mm, preferably 3.0 and 6.0 mm, and preferably 3.5 and 5.5 mm.

The viscosity sensor 106C has a resolution in a range between about 0.01 and 0.10 Pa·s, preferably 0.02 and 0.09 Pa·s, preferably 0.03 and 0.08 Pa·s, preferably 0.04 and 0.07 Pa·s, and preferably 0.05 and 0.06 Pa·s, and a sampling rate in a range between about 5 and 200 Hz, preferably 10 and 180 Hz, preferably 15 and 160 Hz, preferably 20 and 140 Hz, preferably 25 and 120 Hz, and preferably 30 and 100 Hz.

In an embodiment, the temperature probe 106D of the multi-sensing array 106 is selected from the group consisting of a MEMS microthermistor, a fiber-optic temperature probe 106D, and a thin-film platinum micro RTD.

The temperature probe 106D has an operating temperature range between 8° and 200° C., preferably 85 and 180° C., preferably 90 and 160° C., preferably 95 and 140° C., and preferably 100 and 120° C., a response time in a range between 50 and 300 ms, preferably 60 and 280 ms, preferably 70 and 260 ms, preferably 80 and 240 ms, preferably 90 and 220 ms, and preferably 100 and 200 ms, and a thermal drift of less than about 0.05° C. per hour. The temperature probe 106D further has a sampling rate in a range between about 5 and 200 Hz, a nominal resistance of about 100 to 1,000Ω, preferably 120 to 950Ω, preferably 140 to 900Ω, preferably 160 to 850Ω, preferably 180 to 800Ω, and preferably 200 to 750Ω at 0° C., and a temperature coefficient of resistance (TCR) of about 0.00385Ω/Ω/° C. to 0.00392Ω/Ω/° C.

In an embodiment, the acoustic sensor 106E is selected from the group consisting of a micro-electromechanical systems (MEMS) ultrasonic microphone, a fiber-optic hydrophone, and a piezoelectric acoustic sensor 106E.

The acoustic sensor 106E includes a transduction element 212 selected from the group consisting of a piezoelectric diaphragm, an optical interferometric sensing tip, and a MEMS ultrasonic membrane. The transduction element 212 is configured to convert acoustic pressure variations generated within the mixing chamber 102 into an electrical or optical signal.

The acoustic sensor 106E further includes a front-end interface 214. The front-end interface 214 includes at least one of an impedance matching network 214A, an optical demodulation circuit 214B, and a charge-sensitive preamplifier 214C; and The acoustic sensor 106E has a detection bandwidth between about 50 and 120 kHz, preferably 55 and 110 kHz, preferably 60 and 100 kHz, preferably 65 and 90 kHz, and preferably 70 and 80 kHz, and a signal bandwidth between about 5 and 50 kHz. The acoustic sensor 106E further has a sensitivity between about −180 and −150 dB re 1 V/μPa, preferably −175 and −155 dB re 1 V/μPa, and preferably −170 and −160 dB re 1 V/μPa, a noise floor below 5 μV RMS, and a dynamic range of at least 60 dB.

In an embodiment, the controller 108 is operatively coupled to the mixing mechanism 104. The controller 108 is configured to dynamically modulate the shear-vortex strength corresponding to the rotor speed of the high-shear rotor 104A, in a range between about 500 rpm and 5,000 rpm, relative to the ultrasonic cavitation energy between about 20 and 120 kHz, preferably 25 and 110 kHz, preferably 30 and 100 kHz, preferably 35 and 90 kHz, preferably 40 and 80 kHz, and preferably 45 and 70 kHz. The controller 108 coordinates modulation of the shear-vortex strength and the ultrasonic cavitation energy based on sensing data from the multi-sensor array 106.

The controller 108 is further configured to adjust the acoustic resonance generated by the RAM unit 104D within a frequency range between about 10 and 1,000 Hz, preferably 50 and 900 Hz, preferably 100 and 800 Hz, preferably 150 and 700 Hz, and preferably 200 and 600 Hz to align the shear-vortex strength and the ultrasonic cavitation energy within a synchronization window of about 1 to 50 ms.

In some embodiments, the synchronization window is a temporal interval during which peaks in shear-vortex strength coincide with peaks in ultrasonic cavitation energy. The controller 108 computes a phase alignment metric by comparing the instantaneous phases of rotor-induced shear oscillations and ultrasonic pressure oscillations. A synchronization window between about 1 and 50 ms is maintained by adjusting the acoustic resonance frequency of the RAM unit 104D and the excitation phase of the ultrasonic transducers 104B. Maintaining synchronization enhances the efficiency of modifier breakup and dispersion.

In some embodiments, the controller 108 is configured to normalize each sensing parameter prior to computing the DUI. The normalization function converts raw sensor values into dimensionless quantities bounded between 0 and 1, ensuring consistent weighting across heterogeneous sensing modalities. In one embodiment, normalization is performed using a min-max scaling function according to:

$$X_{norm} = \frac{X - X_{min}}{X_{max} - X_{min}}$$

where X represents a raw measurement of optical transmittance, apparent viscosity, or acoustic-resonance amplitude, and $X_{min}$ and $X_{max}$ represent predefined calibration bounds stored in the controller 108. In another embodiment, normalization is performed using a bounded linear scaling function or a z-score transformation. The normalization parameters may be determined through calibration trials using reference asphalt-modifier mixtures with known dispersion states.

In an embodiment, the DUI is computed according to Equation (1):

$$DUI = w_1 T_{opt} + w_2 \eta_{norm} + w_3 A_{ac} \tag{1}$$

where:

$T_{opt}$ is an optical transmittance, $\eta_{norm}$ is an apparent viscosity, $A_{ac}$ is an acoustic-resonance amplitude, $w_1$ is a weighting factor between about 0.20 and 0.40, $w_2$ is a weighting factor between about 0.10 and 0.30, and $w_3$ is a weighting factor between about 0.20 and 0.40.

TABLE 2

Control Parameters and Calibration Constants

| Parameter | Symbol | Range/ Value | Calibration Method | Purpose |
|---|---|---|---|---|
| Optical weighting factor | $w_1$ | 0.35 | Empirical fitting | Balance clarity contribution |
| Viscosity weighting factor | $w_2$ | 0.40 | Reference test | Normalize rheological data |
| Acoustic weighting factor | $w_3$ | 0.25 | Regression calibration | Capture cavitation efficiency |
| DUI threshold | $DUI_t$ | 0.95 | Validation trials | Target full dispersion |
| Feedback gain | Kf | 0.3-0.6 | PID tuning | Adaptive control loop |

Table 2 summarizes representative weighting factors, thresholds, and control gains used by the controller 108 for DUI computation and adaptive control. The table associates each parameter with a defined symbol, calibrated value, or range, and functional purpose within the control architecture of the system 100.

As shown in Table 2, optical, viscosity, and acoustic weighting factors $w_1$, $w_2$, and $w_3$ are assigned values of approximately 0.35, 0.40, and 0.25, respectively, based on empirical fitting, reference testing, and regression calibration. A DUI threshold of approximately 0.95 represents a target full-dispersion condition. A feedback gain Kf, having a range between about 0.3 and 0.6, is established through control-loop tuning to regulate adaptive adjustment of mixing parameters.

TABLE 3

Dispersion Uniformity Index (DUI) Interpretation

| DUI Range | Dispersion Quality | Description | System Action |
|---|---|---|---|
| 0.00-0.84 | Poor | Visible agglomeration | Increase shear and ultrasonic power |
| 0.85-0.94 | Acceptable | Partial homogeneity | Extend mixing 3-5 min |
| ≥0.95 | Optimal | Fully dispersed | Stop mixing and log data |

Table 3 provides a qualitative interpretation of the DUI values computed by the controller 108 and associates each range with a corresponding dispersion state and system response.

As shown in Table 3, DUI values between 0.00 and 0.84 indicate poor dispersion, characterized by visible agglomeration, in which the controller 108 applies increased shear-vortex strength and ultrasonic cavitation energy. The DUI values between 0.85 and 0.94 correspond to an acceptable dispersion condition with partial homogeneity, in which the controller 108 maintains mixing and extends the mixing duration by approximately 3 to 5 minutes. A DUI value greater than or equal to 0.95 indicates an optimal dispersion condition, indicating a fully dispersed state in which the controller 108 terminates the mixing operation and records process data using the data-logging module 110.

The controller 108 is configured to maintain the DUI within a range between about 0.75 and about 1.0. The controller 108 is configured to adjusting at least one of operating parameters including the shear-vortex strength within the annular shear zone 112A in a range between about 5,000 $s^{-1}$ and 50,000 $s^{-1}$, the ultrasonic cavitation energy within the ultrasonic cavitation zone 112B between about 1 and 20 W/$cm^2$, preferably 2 and 18 W/$cm^2$, preferably 3 and 16 W/$cm^2$, preferably 4 and 14 W/$cm^2$, preferably 5 and 12 W/$cm^2$, and preferably 6 and 10 W/$cm^2$, and the vibrational acceleration generated by the RAM unit 104D in a range between about 10 g and 100 g. The controller 108 is further configured to adjust the ultrasonic excitation amplitude supplied to the plurality of ultrasonic transducers 104B in a range between about 10 and 200 Vpp, preferably 30 and 180 Vpp, preferably 50 and 160 Vpp, preferably 70 and 140 Vpp, preferably 90 and 120 Vpp, and preferably 100 and 150 Vpp, and to adjust the ultrasonic excitation phase between about 0° and 360°, preferably 20° and 320°, preferably 40° and 280°, preferably 60° and 240°, preferably 80° and 200°, and preferably 100° and 200°.

The controller 108 is further configured to increase or decrease at least one of the shear-vortex strength, the ultrasonic cavitation energy, and the ultrasonic excitation amplitude via a closed-loop adaptive control algorithm. The closed-loop adaptive control algorithm uses sensing data from the multi-sensor array 106 and iteratively adjusts the operating parameters during a mixing cycle to keep the DUI within the target range.

In some embodiments, the controller 108 executes a closed-loop adaptive control algorithm comprising proportional-integral-derivative (PID) control elements. The controller 108 computes an error signal based on the deviation of the DUI from a target range and adjusts shear-vortex strength, ultrasonic cavitation energy, and vibrational acceleration accordingly. In another embodiment, the controller 108 employs a model predictive control (MPC) algorithm that forecasts future DUI values based on current sensor readings and adjusts operating parameters to minimize predicted dispersion error. In yet another embodiment, the controller 108 uses rule-based logic derived from Tables 2 and 3 to adjust mixing parameters.

In some embodiments, the controller 108 performs sensor fusion using a weighted-average algorithm that combines optical, rheological, torque, temperature, and acoustic measurements. In another embodiment, the controller 108 employs a Kalman filter to estimate dispersion state variables by reducing noise and compensating for sensor drift. In yet another embodiment, the controller 108 uses a multi-stage fusion pipeline in which optical and acoustic data are fused first to estimate particle distribution, followed by viscosity-based refinement of the dispersion estimate.

Figure 3:
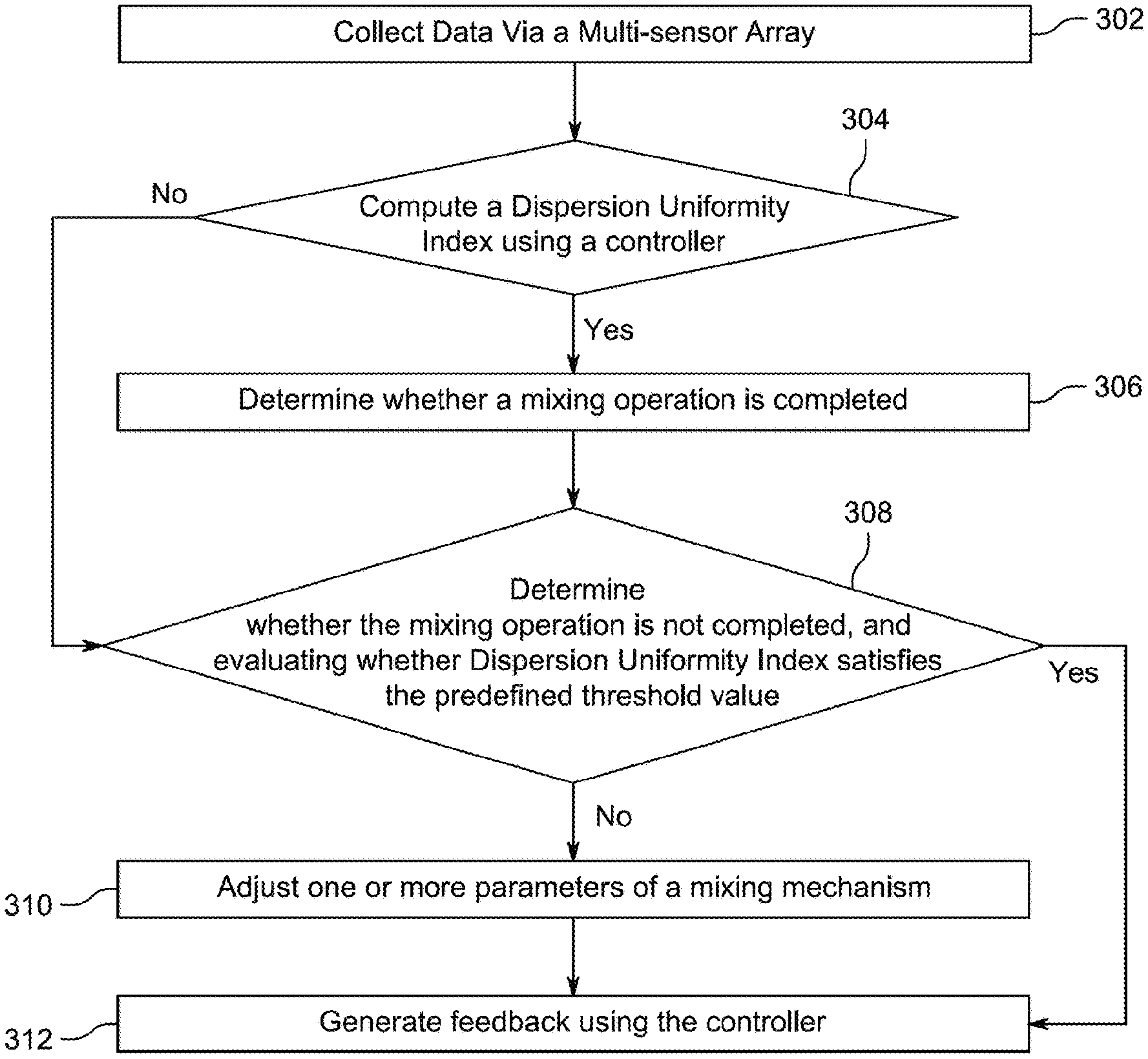
FIG. 3 is an exemplary flow chart of a method of using the integrated dispersion and quantification system, according to certain embodiments.

Referring to FIG. 3, an exemplary flowchart of a method 300 of using the integrated dispersion and quantification system 100 is illustrated, according to certain embodiments.

The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure.

At step 302, the method 300 includes collecting data via the multi-sensor array 106. The sensing data includes optical data from the optical sensor 106A, torque data from the torque sensor 106B, viscosity data from the viscosity sensor 106C, temperature data from the temperature probe 106D, and acoustic data from the acoustic sensor 106E. The sensing data is transmitted to the controller 108 for processing.

At step 304, the method 300 includes computing the DUI using the controller 108. The DUI is computed based on the sensing data collected at step 302 in accordance with Equation (1). The computation of the DUI includes normalization of optical dispersion parameters, viscosity parameters, and acoustic activity parameters, and application of predefined weighting factors stored in the memory of the controller 108.

At step 306, the method 300 includes determining whether a mixing operation is completed. Determination of completion is performed by comparing the Dispersion DUI computed at step 304 with one or more predefined completion criteria stored in the controller 108. The completion criteria include a target DUI range and a minimum mixing-zone residence time or a maximum allowable energy input. The predefined completion criteria include a target DUI in a range between about 0.75 and about 1.0

At step 308, the method 300 includes determining whether the mixing operation is incomplete and evaluating whether DUI meets the predefined threshold value. The predefined threshold value represents the minimum acceptable dispersion state required to progress toward completion of the mixing operation. The evaluation of the dispersion progression state includes comparing the DUI computed at step 304 to a predefined threshold value stored in the controller 108. The predefined threshold value is lower than the target Dispersion Uniformity Index range used to determine completion at step 306. The controller 108 determines whether the Dispersion Uniformity Index meets the predefined threshold to assess whether the mixing operation is approaching completion or requires further adjustment of operating parameters before continuing.

At step 310, the method 300 includes adjusting one or more parameters of the mixing mechanism 104. The one or more parameters are based on an outcome of the evaluation performed at step 308. Adjustment of the operating parameters includes modifying at least one of a shear vortex strength within the annular shear zone 112A, an ultrasonic cavitation energy within the ultrasonic cavitation zone 112B, a vibrational acceleration generated by the resonant acoustic mixing unit 104D, an ultrasonic excitation amplitude supplied to the plurality of ultrasonic transducers 104B, or an ultrasonic excitation phase applied to the plurality of ultrasonic transducers 104B.

At step 312, the method 300 includes generating feedback using the controller 108. The feedback includes updated control signals transmitted to the mixing mechanism 104 and updated process status information recorded by the data-logging module 110. The feedback further includes storing the Dispersion Uniformity Index, sensing data, operating parameter values, and energy usage associated with the mixing cycle as a digital record of the asphalt modification process.

Figure 4A:
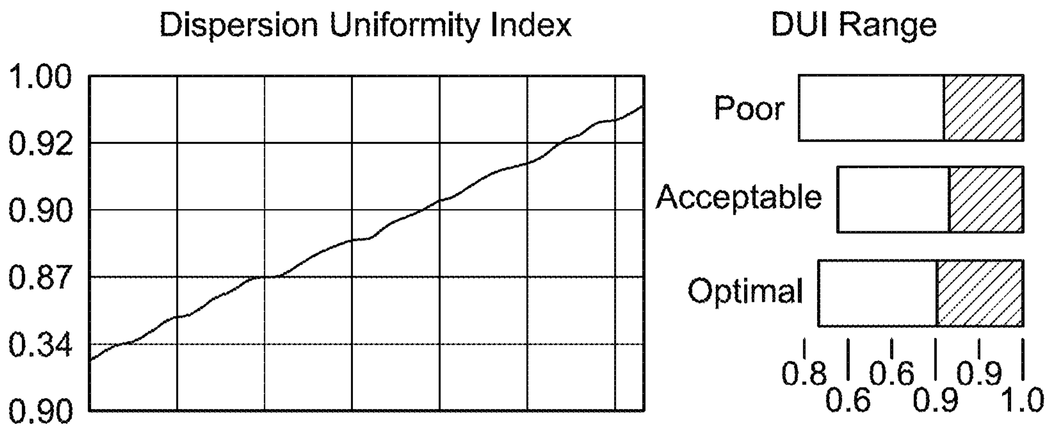
FIG. 4A is a graph showing Dispersion Uniformity Index (DUI) of an asphalt binder-modifier mixture processed using the integrated dispersion and quantification system according to certain embodiments.

Referring to FIG. 4A, a graph showing the DUI of an asphalt binder-modifier mixture processed during the system 100 is illustrated. The DUI is plotted on the Y-axis, and the mixing duration is plotted on the X-axis. As shown in FIG. 4A, the DUI increases from an initial value corresponding to an undispersed or partially dispersed state of a modifier material toward a target range indicative of a uniform dispersion state. Variations in the slope of the DUI curve correspond to adjustments to the operating parameters of the mixing mechanism 104, controlled by the controller 108, during the mixing cycle.

Figure 4B:
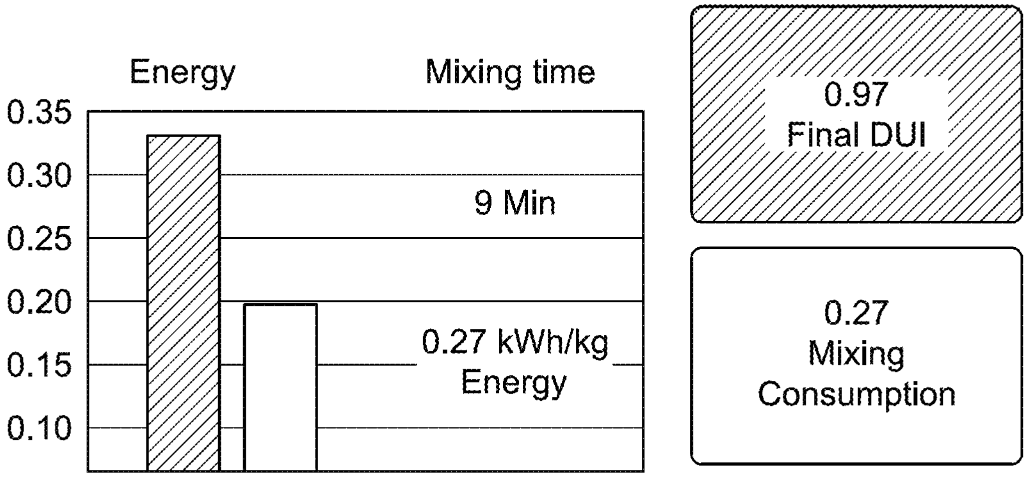
FIG. 4B is a graph showing energy consumption and mixing time for an asphalt modification process performed using the integrated dispersion and quantification system, according to certain embodiments.

Referring to FIG. 4B illustrates a graph of energy consumption and mixing time for an asphalt modification process performed using the system 100. The graph shows specific energy consumption on the Y-axis for a representative asphalt modification process conducted using system 100, and mixing time on the X-axis.

The experimental results show a final Dispersion Uniformity Index of 0.97, indicating uniform dispersion of the modifier within the asphalt binder.

As shown in FIG. 4B, the total mixing time required to reach the final Dispersion Uniformity Index is approximately 9 minutes. The corresponding specific energy consumption is approximately 0.27 kilowatt-hours per kilogram of processed material. The mixing consumption for the experimental run is approximately 0.27, indicating an efficient balance between mixing duration and energy input under the operating conditions of the system 100.

TABLE 4

Comparative Results with Conventional Mixing

| Method | Final DUI | Mixing Time (min) | Energy Input (kWh/kg) | Remarks |
|---|---|---|---|---|
| Conventional high-shear only | 0.88 | 20 | 0.32 | Partial agglomerates |
| Hybrid shear + ultrasound | 0.97 | 10 | 0.28 | Uniform dispersion |
| Manual stirring | 0.72 | 45 | 0.15 | Poor dispersion |
| Shear + thermal | 0.91 | 18 | 0.35 | Improved, not quantified |
| Automated hybrid (IHDQS) | 0.98 | 9 | 0.27 | Fully dispersed, reproducible |

Table 4 presents a comparative evaluation of dispersion performance, mixing duration, and energy consumption for different asphalt mixing approaches. As shown in Table 4, conventional high-shear-only mixing attains a final Dispersion Uniformity Index of approximately 0.88 with a mixing time of about 20 minutes and an energy input of approximately 0.32 kWh/kg, indicating partial agglomeration. Manual stirring yields a lower DUI of approximately 0.72 and a longer mixing time of about 45 minutes, indicating poor dispersion quality. Shear, combined with thermal treatment, improves dispersion to a DUI of approximately 0.91 but requires higher energy input and lacks quantifiable verification of dispersion.

Hybrid shear-and-sonication mixing attains a DUI of approximately 0.97 with reduced mixing time and energy input. The automated hybrid operation using the integrated dispersion and quantification system 100 attains a DUI of approximately 0.98 within about 9 minutes and an energy input of approximately 0.27 kWh/kg, demonstrating fully dispersed and reproducible results under controlled conditions.

TABLE 5

Energy Consumption and Efficiency

| Mix Type | Ultrasonic Power (W) | Mixing Time (min) | Total Energy (kWh) | Energy per kg (kWh/kg) | Efficiency (%) |
|---|---|---|---|---|---|
| SBS polymer | 600 | 12 | 0.12 | 0.028 | 96 |
| Nanoclay | 800 | 10 | 0.13 | 0.027 | 97 |
| Graphene oxide | 750 | 9 | 0.11 | 0.025 | 98 |
| Crumb rubber | 700 | 15 | 0.18 | 0.033 | 95 |
| Cellulose fiber | 400 | 14 | 0.09 | 0.026 | 96 |

Table 5 representative energy usage metrics associated with different asphalt modifier types processed using the integrated dispersion and quantification system 100. The table correlates ultrasonic power input, mixing duration, total electrical energy consumption, specific energy per unit mass, and overall process efficiency.

As shown in Table 5, ultrasonic power levels between about 400 W and 800 W, combined with mixing times between approximately 9 and 15 minutes, result in total energy consumption ranging from about 0.09 to 0.18 kWh. The corresponding specific energy consumption remains between about 0.025 and 0.033 kWh/kg across evaluated mix types. Efficiency values between approximately 95% and 98% indicate effective conversion of input energy into dispersion work for polymer, nanomaterial, rubber, and fiber modifiers.

TABLE 6

Repeatability and Reliability

| Test ID | Additive Type | Mean DUI | Std. Dev. (σ) | Repeatability (R %) |
|---|---|---|---|---|
| T1 | SBS polymer | 0.965 | 0.004 | 99.6 |
| T2 | Nanoclay | 0.973 | 0.003 | 99.7 |
| T3 | Graphene oxide | 0.981 | 0.002 | 99.8 |
| T4 | Crumb rubber | 0.941 | 0.007 | 99.3 |
| tablT5 | Cellulose fiber | 0.956 | 0.005 | 99.5 |

Table 6 represents the repeatability performance obtained from multiple mixing cycles conducted using the integrated dispersion and quantification system 100 for different asphalt modifier types. The table presents mean DUI values, statistical variation, and repeatability metrics derived from repeated experimental runs under identical operating conditions.

As shown in Table 6, mean DUI values range from approximately 0.941 to 0.981 across polymer, nanomaterial, rubber, and fiber additives. The associated standard deviation values remain below approximately 0.007, indicating low cycle-to-cycle variation in dispersion quality. Repeatability values exceeding approximately 99.3% demonstrate consistent system performance across repeated mixing operations.

Figure 5:
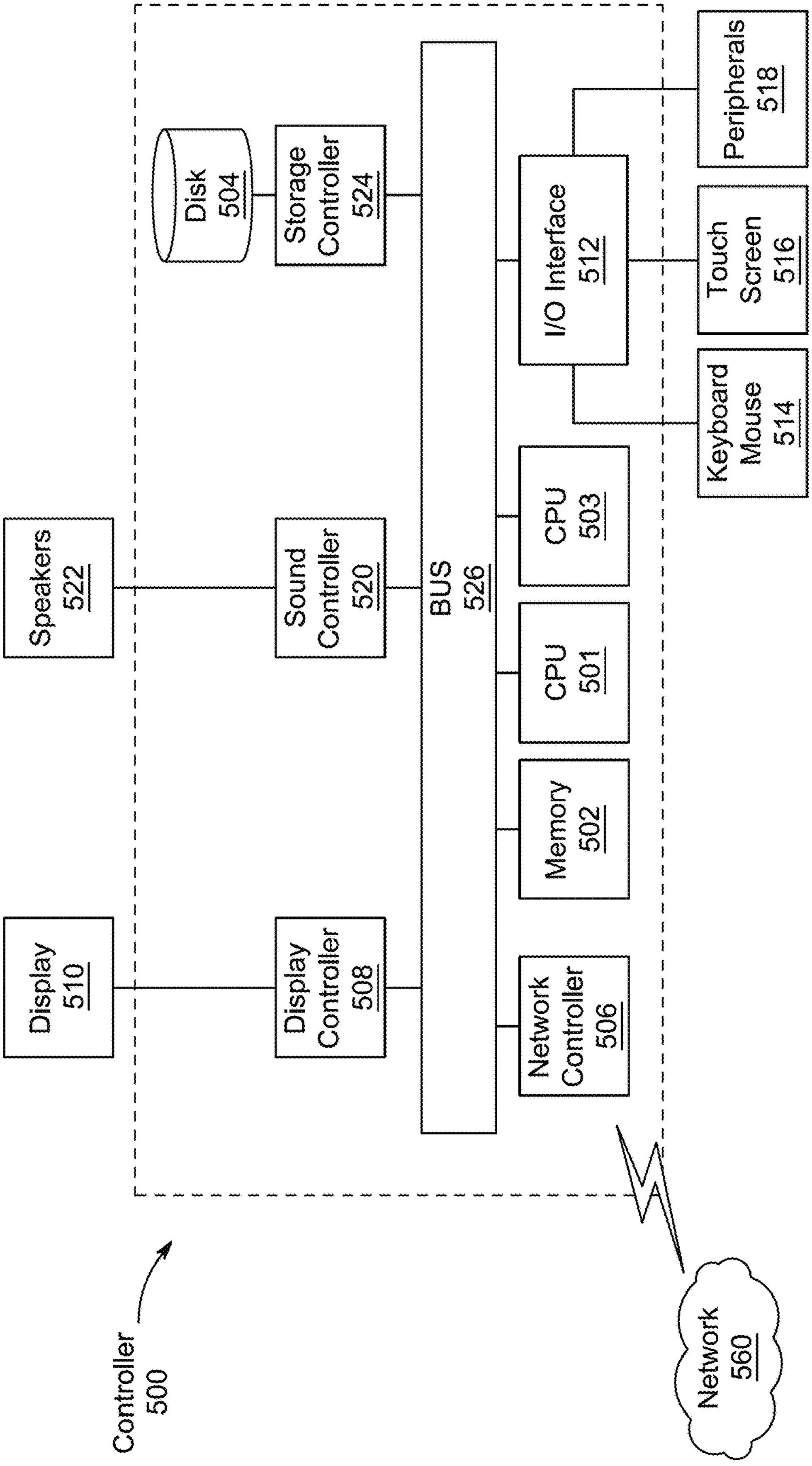
FIG. 5 is an illustration of a non-limiting example of details of computing hardware used in a controller of the integrated dispersion and quantification system, according to certain embodiments.

In FIG. 5, a controller 500 is described embodying the controller 108 of the integrated dispersion and quantification system 100 of the present disclosure, in which the controller 500 is a computing device coupled to a processor that includes a CPU 501, which performs the processes described above/below. The processed data and instructions may be stored in memory 502. These processes and instructions may also be stored on a storage medium disk 504, such as a hard drive (HDD) or portable storage medium, or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, Microsoft Windows 10, Microsoft Windows 10, UNIX, Solaris, LINUX, Apple MAC-OS and other systems known to those skilled in the art.

The hardware elements required to implement the computing device may be implemented using various circuitry elements, as known to those skilled in the art. For example, CPU 501 or CPU 503 may be a Xenon or Core processor from Intel of America, an Opteron processor from AMD of America, or another processor type recognized by one of ordinary skill in the art. Alternatively, the CPU 501, 503 may be implemented on an FPGA, ASIC, PLD, or using discrete logic circuits, as one of ordinary skill in the art may recognize. Further, CPUs 501 and 503 may be implemented as multiple processors that cooperatively work in parallel to execute the instructions of the inventive processes described above.

The computing hardware in FIG. 5 also includes a network controller 506, such as an Intel Ethernet PRO network interface card from Intel Corporation of America, for interfacing with the network. As may be appreciated, the network may be a public network, such as the Internet, or a private network, such as an LAN or WAN network, or any combination thereof, and may also include PSTN or ISDN subnetworks. The network may also be wired, such as an Ethernet network, or may be wireless, such as a cellular network including EDGE, 3G, 4G, and 5G wireless cellular systems. The wireless network may also be Wi-Fi, Bluetooth, or any other known wireless communication technology.

The computing device further includes a display controller 508, such as a NVIDIA GeForce GTX or Quadro graphics adaptor from NVIDIA Corporation of America, for interfacing with display 510, such as a Hewlett Packard HPL2445w LCD monitor. A general-purpose I/O interface 512 interfaces with a keyboard and/or mouse 514, as well as a touch screen panel 516 on or separate from a display 510. The General-purpose I/O interface also connects to a variety of peripherals 518 including printers and scanners, such as an OfficeJet or DeskJet from Hewlett-Packard.

A sound controller 520 is also provided in the computing device, such as Sound Blaster X-Fi Titanium from Creative, to interface with speakers/microphone 522, thereby providing sounds and/or music.

The general-purpose storage controller 524 connects the storage medium disk 504 with the communication bus 526, which may be an ISA, EISA, VESA, PCI, or similar, for interconnecting the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity, as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 6.

Figure 6:
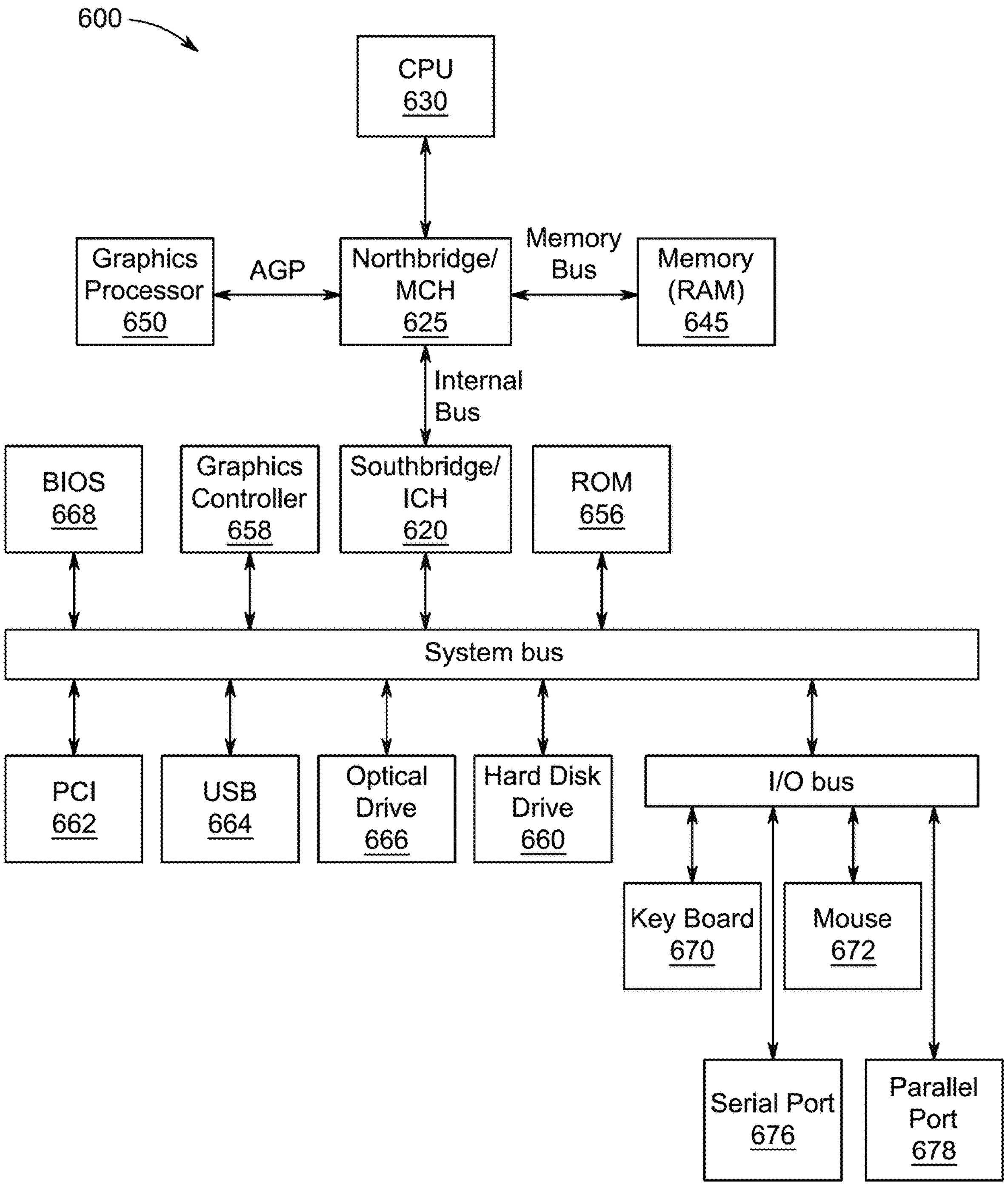
FIG. 6 is an exemplary schematic diagram of a data processing system used within the controller of the integrated dispersion and quantification system, according to certain embodiments.

FIG. 6 shows a schematic diagram of a data processing system used within the controller 108 of the system 100, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and may even be implemented using one or more heterogeneous processor systems.

Figure 7:
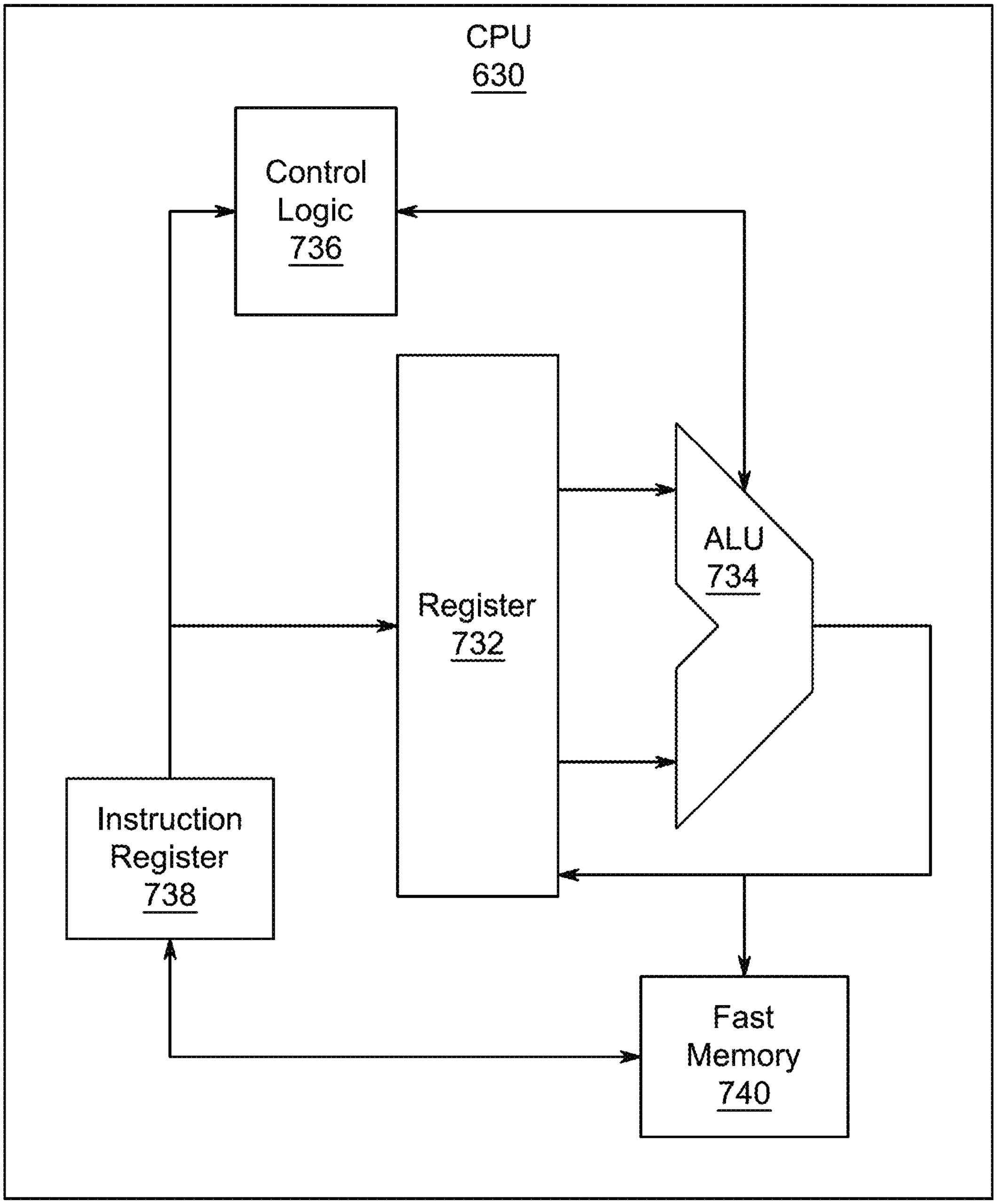
FIG. 7 is an exemplary schematic diagram of a processor of the integrated dispersion and quantification system, according to certain embodiments.

For example, FIG. 7 shows one implementation of CPU 630. In one implementation, the instruction register 738 retrieves instructions from the fast memory 740. At least part of these instructions is fetched from the instruction register 738 by the control logic 736 and interpreted according to the instruction set architecture of the CPU 630. Part of the instructions may also be directed to the register 732. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations may be fed back into the register and/or stored in the fast memory 740. According to certain implementations, the instruction set architecture of the CPU 630 may use a reduced instruction set architecture, a complex instruction set architecture, a vector processor architecture, and a very large instruction word architecture. Furthermore, the CPU 630 may be based on the Von Neumann model or the Harvard model. The CPU 630 may be a digital signal processor, an FPGA, an ASIC, a PLA, a PLD, or a CPLD. Further, the CPU 630 may be an x86 processor by Intel or AMD; an ARM processor; a Power architecture processor by, e.g., IBM; a SPARC architecture processor by Sun Microsystems or Oracle; or another known CPU architecture.

Referring again to FIG. 6, the data processing system 600 may include the SB/ICH 620, which is coupled through a system bus to an I/O Bus, a read-only memory (ROM) 656, a universal serial bus (USB) port 664, a flash binary input/output system (BIOS) 668, and a graphics controller 658. PCI/PCIe devices may also be coupled to SB/ICH 688 through a PCI bus 662.

The PCI devices may include, for example, Ethernet adapters, add-in cards, and PC cards for notebook computers. The Hard disk drive 660 and CD-ROM 666 may use, for example, an Integrated Drive Electronics (IDE) or Serial Advanced Technology Attachment (SATA) interface. In one implementation, the I/O bus may include a super I/O (SIO) device.

Furthermore, the hard disk drive (HDD) 660 and optical drive 666 may be coupled to the SB/ICH 620 via a system bus. In one implementation, a keyboard 670, a mouse 672, a parallel port 678, and a serial port 676 may be connected to the system bus through the I/O bus. Other peripherals and devices that may be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended backup load to be powered.

Figure 8:
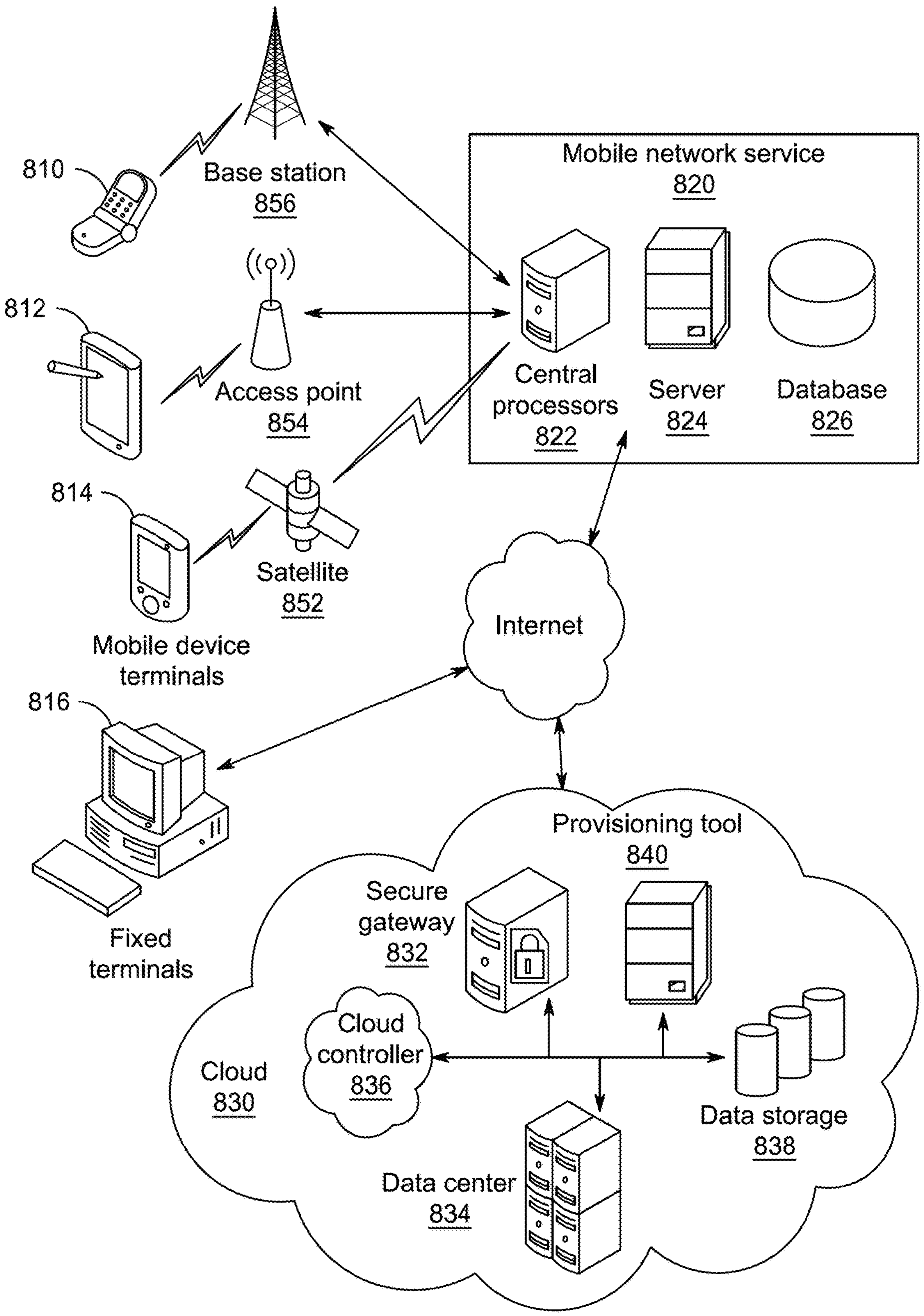
FIG. 8 is an illustration of a non-limiting example of distributed components that may share processing with the controller of the integrated dispersion and quantification system, according to certain embodiments.

The functions and features described herein may also be executed by various distributed components of a system. For example, one or more processors may execute these system functions, with the processors distributed across multiple components that communicate over a network. The distributed components may include one or more client and server machines, such as cloud 830 including a cloud controller 836, a secure gateway 832, a data center 834, data storage 838 and a provisioning tool 840, and mobile network services 820 including central processors 822, a server 824 and a database 826, which may share processing, as shown by FIG. 8, in addition to various human interface and communication devices (e.g., display monitors 816, smart phones 810, tablets 812, personal digital assistants (PDAs) 814). The network may be a private network, such as a LAN, satellite 852, or WAN 854, or a public network, such as the Internet. Input to the system may be received directly from users and remotely in real time or as a batch process. Additionally, some implementations may be performed on modules or hardware not identical to those described. Accordingly, other implementations are within the scope that may be claimed.

The above-described hardware description is a non-limiting example of a corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An integrated dispersion and quantification system for asphalt modification, comprising:
- a mixing chamber configured to receive an asphalt binder and at least one modifier material selected from the group consisting of a polymer, a fiber, an elastomeric particle, and a nanomaterial,
- a mixing mechanism disposed within the mixing chamber and comprising:
  - a coaxial high-shear rotor;
  - a plurality of ultrasonic transducers positioned circumferentially around the mixing chamber and configured to generate a multi-directional sonication field and an ultrasonic cavitation zone; and
  - a resonant acoustic mixing (RAM) unit configured to generate a vibrational acceleration and an acoustic resonance;
- a multi-sensor array comprising at least one of:
  - an optical sensor;
  - a torque sensor;
  - a viscosity sensor;
  - a temperature probe; and
  - an acoustic sensor;
- a controller operatively coupled to the mixing mechanism and the multi-sensor array, wherein the controller is configured to:
  - determine a dispersion quality via a Dispersion Uniformity Index (DUI) based on sensing data from the multi-sensor array;
  - activate or deactivate at least one component of the mixing mechanism in response to the DUI; and
  - adjust one or more of:
    - a shear-vortex strength generated by the high-shear rotor,
    - an ultrasonic cavitation energy generated by the ultrasonic transducers,
    - the vibrational acceleration, and
    - the acoustic resonance; and
- a data-logging module configured to generate a digital record of the dispersion quality, the sensing data, and energy usage for a mixing cycle.

2. The system of claim 1, wherein the mixing chamber comprises a pressure vessel selected from the group consisting of:
- a cylindrical pressure-rated vessel,
- a jacketed thermal-control vessel,
- a double-walled insulated vessel, and
- a composite-reinforced metal vessel; and
- wherein the mixing chamber has:
- an internal diameter between 50 mm and 300 mm,
- a wall thickness between 2 mm and 8 mm, and
- an internal coating selected from the group consisting of a fluoropolymer lining, a ceramic-reinforced epoxy, and a boron-nitride coating.

3. The system of claim 1, wherein:
- the high-shear rotor is disposed at a center of the mixing chamber and mounted on a drive shaft aligned with a longitudinal axis of the mixing chamber;
- the ultrasonic transducers are mounted circumferentially around the mixing chamber and radially oriented to direct ultrasonic energy inward toward the high-shear rotor and an annular shear zone surrounding the high-shear rotor;
- the RAM unit is mechanically coupled to an exterior of the mixing chamber through a mounting frame and configured to transmit vibrational energy to the mixing chamber; and
- wherein the high-shear rotor, the ultrasonic transducers, and the RAM unit are spatially arranged to form a shear-acoustic mixing architecture comprising:
  - the shear zone generated by the high-shear rotor,
  - the ultrasonic cavitation zone surrounding the shear zone, and
  - a low-frequency vibrational field superimposed on the shear and ultrasonic cavitation zones by the RAM unit.

4. The system of claim 3, wherein the shear-acoustic mixing architecture comprises:
- the ultrasonic transducers positioned at a radial distance between about 5 and 25 mm from an outer perimeter of the high-shear rotor;
- the shear zone having a radial thickness between about 2 and 10 mm;
- the ultrasonic cavitation zone extending radially outward from the shear zone by between about 3 and 20 mm; and
- the low-frequency vibrational field is aligned along a principal vibrational axis oriented parallel to the longitudinal axis of the mixing chamber.

5. The system of claim 4, wherein the mixing mechanism is configured for:
an effective shear rate between about 5,000 and 50,000 $s^{-1}$ within the shear zone;
a combined mechanical-ultrasonic-acoustic energy density between about 0.5 and 5 kW/L;
a shear-to-ultrasonic energy ratio between about 1:0.1 and 1:1;
a low-frequency vibrational coupling efficiency between about 60% and 95%, based on a ratio of the vibrational energy transmitted to the mixing chamber relative to an input energy of the RAM unit; and
a mixing-zone residence time between about 1s and 30s per circulation cycle.

6. The system of claim 1, wherein the high-shear rotor is formed from a composition selected from the group consisting of a stainless steel 316L, a hardened tool steel, a tungsten-carbide-coated steel, a titanium alloy, and a ceramic-matrix composite alloy.

7. The system of claim 1, wherein the high-shear rotor has:
a rotor diameter between about 20 and 120 mm,
a rotor length between about 30 and 150 mm,
a rotor thickness between about 1.0 and 6.0 mm,
between 12 and 48 shear teeth with a tooth-tip clearance between about 50 and 500 μm,
a surface-finish roughness between Ra 0.1 and 1.0 μm,
a thermal-stability rating between 80° C. and 200° C., and
an abrasion-resistant coating selected from the group consisting of tungsten carbide, diamond-like carbon (DLC), and boron-nitride-based coatings.

8. The system of claim 1, wherein the ultrasonic transducers comprise:
a sonotrode element having a length between 20 and 120 mm and a tip diameter between 5 mm and 30 mm, configured to provide an acoustic-gain factor between 2× and 10×;
a backing layer including tungsten, steel, and epoxy-tungsten composite with an acoustic impedance between 20 and 100 MRayl;
a matching layer including alumina, silica-epoxy composite, and polymer-ceramic laminate; and
wherein the matching layer has a thickness of about 0.1 to 1.0 mm.

9. The system of claim 1, wherein the ultrasonic transducers are disposed:
in a circumferential array around the mixing chamber at angular intervals between about 10° and 90°;
in a surround-field configuration configured to generate rotating, stationary, and swept-frequency sonication modes between 10 and 50 kHz;
at an axial elevation between 5 and 60 mm above a base of the mixing chamber; and
wherein the ultrasonic transducers are driven by a phase-shifted excitation signal with phase offsets of about 10° to about 180°.

10. The system of claim 1, wherein the RAM unit comprises:
a counter-oscillating mass assembly including a first oscillating mass and a second oscillating mass configured to move in opposite directions along a common oscillation axis;
an electromechanical actuator comprising at least one of a voice-coil actuator, a linear motor, and an eccentric-mass motor; and
a spring-mass resonance subsystem including one or more spring elements selected from the group consisting of coil springs, elastomeric isolators, and leaf springs.

11. The system of claim 1, wherein the RAM unit is configured to provide:
the vibrational acceleration of about 10 to 100 g;
a stroke amplitude of about 0.1 to 5 mm;
the acoustic resonance of about 10 to 1000 Hz with a resonance amplitude of about 0.1 to 2 mm; and
an input electrical power rating of about 100 to 2,000 W.

12. The system of claim 1, wherein the multi-sensor array is disposed:
along an inner wall of the mixing chamber at about 1 to 10 circumferential positions;
at multiple axial elevations spaced between about 10 and 80 mm apart;
within about 5 to 20 mm of the shear zone;
within a thermally insulated port having:
a depth between about 2 and 10 mm,
an inner diameter between 6 and 20 mm,
a thermally insulating liner selected from the group consisting of ceramic-filled epoxy, polyimide, and aerogel-reinforced composite, and
an acoustic-damping backfill selected from the group consisting of silicone gel and polyurethane elastomer; and
wherein each sensor is encapsulated with a coating selected from the group consisting of a high-temperature fluoropolymer coating, a ceramic-reinforced epoxy encapsulant, a silicone-polyimide elastomer, and a boron-nitride-filled polymer composite.

13. The system of claim 1, wherein the optical sensor is selected from the group consisting of a hyperspectral micro-array, a tunable-wavelength MEMS filter, and a dual-wavelength scattering probe;
wherein the optical sensor comprises:
an optical probe operating between about 400 and 900 nm with a sampling rate between about 10 and 200 Hz;
a collimated illumination beam having a spot diameter between about 0.5 and 3 mm;
a photodiode detector with a responsivity between about 0.1 and 0.9 A/W;
an optical path length between about 1 and 10 mm; and
wherein the optical sensor has:
a spectral resolution between about 2 and 20 nm,
a signal-to-noise ratio between about 40 and 80 dB,
an optical dynamic range between about 60 and 120 dB, and
an optical-transmittance stability within about 0.5% over a 10-minute interval.

14. The system of claim 1, wherein the torque sensor comprises:
a magnetoelastic transducer configured to measure torque between about 0.1 and 5 N·m;
a Wheatstone-bridge strain-gauge array with gauge factors between about 1.0 and 2.5;
a magnetoelastic sensing core with permeability variation sensitivity between about 0.5 and 3%/MPa;
a signal-conditioning module operatively coupled to the strain-gauge array and the magnetoelastic transducer;
wherein the signal-conditioning module is configured to:
amplify an output of a Wheatstone bridge using a low-noise amplifier having an input-referred noise below about 20 nV/VHz;
apply a low-pass filter having a cutoff frequency between about 10 and 500 Hz; and apply a notch filter tuned to attenuate frequencies between about 10 and 100 Hz.

15. The system of claim 1, wherein the viscosity sensor is selected from the group consisting of a piezo-oscillatory micro-viscometer, a MEMS shear-mode resonator, and an ultrasonic attenuation-based viscosity analyzer;

wherein the viscosity sensor comprises:

an ultrasonic rheology probe configured to measure apparent viscosity between about 0.1 and 50 Pa·s;

a spindle of the rheology probe having a diameter between 3 and 15 mm and a length between about 10 and 40 mm;

an oscillatory shear element configured to operate at frequencies between 1 and 200 Hz with shear strain amplitudes between 0.1% and 10% relative to a nominal shear gap between the spindle and the asphalt binder;

an ultrasonic viscosity probe operating between 1 and 10 MHz with an acoustic path length between about 1 and 8 mm; and wherein the viscosity sensor has a resolution between about 0.01 and 0.10 Pa·s, and a sampling rate between about 5 and 200 Hz.

16. The system of claim 1, wherein the temperature probe is selected from the group consisting of a MEMS micro-thermistor, a fiber-optic temperature probe, and a thin-film platinum micro-RTD; and wherein the temperature probe has:

an operating temperature between about 80° C. and 200° C., a response time between 50 and 300 ms, a thermal drift of less than about 0.05° C. per hour, a sampling rate between about 5 and 200 Hz, a nominal resistance of about 100 to 1,000Ω at 0° C., and a temperature coefficient of resistance (TCR) of about 0.00385 to 0.00392Ω/Ω/° C.

17. The system of claim 1, wherein the acoustic sensor is selected from the group consisting of a micro-electromechanical systems (MEMS) ultrasonic microphone, a fiber-optic hydrophone, and a piezoelectric acoustic sensor;

wherein the acoustic sensor comprises:

a transduction element selected from the group consisting of a piezoelectric diaphragm, an optical interferometric sensing tip, and a MEMS ultrasonic membrane;

a front-end interface comprising at least one of an impedance-matching network, an optical demodulation circuit, and a charge-sensitive preamplifier; and wherein the acoustic sensor has:

a detection bandwidth between about 50 and 120 kHz, a signal bandwidth between about 5 and 50 kHz, a sensitivity between about −180 and −150 dB re 1 V/μPa, a noise floor below 5 μV RMS, and a dynamic range of at least 60 dB.

18. The system of claim 1, wherein the controller is operatively coupled to the mixing mechanism and configured to:

dynamically modulate the shear-vortex strength corresponding to a rotor speed between about 500 and 5,000 rpm relative to the ultrasonic cavitation energy between about 20 and 120 kHz; and adjust the acoustic resonance between about 10 and 1,000 Hz to align the shear-vortex strength and the ultrasonic cavitation energy within a synchronization window of about 1 to 50 ms.

19. The system of claim 1, wherein the DUI is computed according to Equation (1):

$$DUI = w_1 T_{opt} + w_2 \eta_{norm} + w_3 A_{ac} \tag{1}$$

where:

$T_{opt}$ is an optical transmittance, $\eta_{norm}$ is an apparent viscosity, $A_{ac}$ is an acoustic-resonance amplitude, $w_1$ is a weighting factor between about 0.20 and 0.40, $w_2$ is a weighting factor between about 0.10 and 0.30, and $w_3$ is a weighting factor between about 0.20 and 0.40.

20. The system of claim 19, wherein the controller is configured to maintain the DUI between about 0.75 and about 1.0 by:

adjusting at least one of:

the shear-vortex strength between about 5,000 and 50,000 $s^{-1}$, the ultrasonic cavitation energy between about 1 and 20 $W/cm^2$, the vibrational acceleration between about 10 and 100 g, an ultrasonic excitation amplitude between about 10 and 200 Vpp, and an ultrasonic excitation phase between about 0° and 360°; and increasing or decreasing at least one of the shear-vortex strength, the ultrasonic cavitation energy, and the ultrasonic excitation amplitude via a closed-loop adaptive-control algorithm.

* * * * *